United States Patent
Shaikh NASIRUZZAMAN et al.

(10) Patent No.: US 12,479,721 B1
(45) Date of Patent: Nov. 25, 2025

(54) METHOD OF PRODUCING HYDROGEN FROM AMMONIA

(71) Applicant: King Fahd University of Petroleum and Minerals, Dhahran (SA)

(72) Inventors: M. Shaikh NASIRUZZAMAN, Dhahran (SA); Mohammad Usman, Dhahran (SA); Zain Hassan Yamani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/236,318

(22) Filed: Jun. 12, 2025

(51) Int. Cl.
| | | |
|---|---|---|
| *C01B 3/04* | (2006.01) | |
| *B01J 21/04* | (2006.01) | |
| *B01J 23/83* | (2006.01) | |
| *B01J 35/45* | (2024.01) | |
| *B01J 37/00* | (2006.01) | |
| *B01J 37/04* | (2006.01) | |
| *B01J 37/08* | (2006.01) | |

(52) U.S. Cl.
CPC ............. *C01B 3/047* (2013.01); *B01J 21/04* (2013.01); *B01J 23/83* (2013.01); *B01J 35/45* (2024.01); *B01J 37/0036* (2013.01); *B01J 37/04* (2013.01); *B01J 37/08* (2013.01)

(58) Field of Classification Search
None
See application file for complete search history.

(56) References Cited

U.S. PATENT DOCUMENTS

2024/0228272 A9    7/2024  Sheludko et al.

FOREIGN PATENT DOCUMENTS

| CN | 108031474 A | 5/2018 | |
|---|---|---|---|
| CN | 108212166 B | 4/2021 | |
| CN | 114160150 B | 1/2023 | |
| KR | 102784469 B1 * | 3/2025 | ............ C01B 3/047 |
| WO | 2023241557 A1 | 12/2023 | |

OTHER PUBLICATIONS

Okura et al ("Promotion effect of rare-earth elements on the catalytic decomposition of ammonia over Ni/Al2O3 catalyst", Applied Catalysis A: General, 505 (2015), pp. 77-85 (Year: 2015).*
Machine Translation for Lee (KR-102784469-B1) (Year: 2025).*
Zehra Nur Yildiz, et al., "Conversion of ammonia to hydrogen in the microwave reactor system using Mo@Alumina catalysts with the promotion of rare-earth and alkaline earth elements", Renewable Energy, vol. 228. Jul. 2024, 5 Pages.
Ling-Feng Zhang, et al., "Ce-modified Ni nanoparticles encapsulated in SiO2 for COx-free hydrogen production via ammonia decomposition", International Journal of Hydrogen Energy, vol. 40, Issue 6, Feb. 19, 2015, pp. 2648-2656. 5 Pages.

* cited by examiner

*Primary Examiner* — Michael Forrest
(74) *Attorney, Agent, or Firm* — Oblon, McClelland, Maier & Neustadt, L.L.P.

(57) ABSTRACT

A method of producing hydrogen from ammonia includes exposing ammonia to a rare-earth/NiO/Al$_2$O$_3$ nanocomposite material. The rare-earth/NiO/Al$_2$O$_3$ nanocomposite material catalyzes the decomposition of ammonia into hydrogen. The rare-earth/NiO/Al$_2$O$_3$ nanocomposite material is in the form of rare-earth doped NiO nanoparticles distributed on a Al$_2$O$_3$ matrix. The rare-earth doped NiO nanoparticles include a rare-earth dopant selected from the group consisting of La, Ce, Nd, Sm and combinations thereof, at a concentration of 1 to 20 wt. % based on the total weight of the rare-earth/NiO/Al$_2$O$_3$ nanocomposite material. The rare-earth doped NiO nanoparticles are spherical with an average diameter in a range from 1 to 200 nm. The rare-earth/NiO/Al$_2$O$_3$ nanocomposite material achieves a 90% or greater conversion of ammonia to hydrogen, based on the total amount of ammonia, at a temperature less than or equal to 550° C., when used to catalyze the decomposition of ammonia.

18 Claims, 20 Drawing Sheets

METHOD OF PRODUCING HYDROGEN FROM AMMONIA

CROSS REFERENCE TO RELATED APPLICATIONS

The present disclosure claims the benefit of Saudi 1020253939, filed Jun. 2, 2025, with the Saudi Authority for Intellectual Property Office, which is incorporated herein by reference in its entirety.

STATEMENT OF ACKNOWLEDGEMENT

Support provided by the Hydrogen Consortium, King Fahd University of Petroleum and Minerals, Saudi Arabia, through Project H2HC2312 is gratefully acknowledged.

BACKGROUND

Technical Field

The present disclosure is directed towards a method of producing hydrogen from ammonia, and more particularly, a method of producing hydrogen by exposing ammonia to a rare-earth/NiO/$Al_2O_3$ nanocomposite material.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Recognized as a clean and adaptable energy carrier, hydrogen has the potential to revolutionize various sectors, from transportation to industrial processes and offers promise as a sustainable energy source. Despite the growing promise of hydrogen as a clean and versatile energy carrier, its large-scale adoption continues to face challenges, particularly in the areas of storage and transportation. Molecular hydrogen, due to its low density, requires either cryogenic temperatures or high-pressure containment systems, both of which impose substantial energy and infrastructure demands.

Among alternative hydrogen carriers, ammonia ($NH_3$) presents a practical solution due to its high hydrogen content and established global infrastructure. However, the decomposition of ammonia into hydrogen and nitrogen typically requires high temperatures and efficient catalytic systems. While noble metals such as Ru, Pt, and Rh demonstrate excellent catalytic performance at relatively moderate temperatures, their high cost and limited availability restrict their scalability for widespread industrial applications.

Efforts to replace noble metals with more abundant transition metals have shown promise, particularly with nickel-based catalysts. Nevertheless, these systems come with their own set of limitations. Nickel catalysts generally require higher operating temperatures-often exceeding 600° C.—to achieve complete ammonia conversion, making them less energy-efficient compared to their noble metal counterparts. Furthermore, these catalysts are prone to sintering and deactivation under prolonged exposure to high temperatures and reducing environments, resulting in diminished long-term stability. Moreover, while several promoter systems-such as alkaline earth metals (e.g., Ba, Sr) and rare-earth elements (e.g., La, Ce)—have been investigated, inconsistencies in performance and limited understanding of promoter-catalyst interactions often hinder reproducibility and scalability.

Each of the aforementioned methods suffers from one or more drawbacks hindering their adoption. Accordingly, it is one object of the present disclosure to provide a synthesis method and system that may circumvent the drawbacks, such as complexity, high cost, lack of multi-phase integration and nanoscale precision, of the materials known in the art.

SUMMARY

In an exemplary embodiment, a method of producing hydrogen from ammonia is described. The method includes exposing ammonia to a rare-earth/NiO/$Al_2O_3$ nanocomposite material. The rare-earth/NiO/$Al_2O_3$ nanocomposite material catalyzes the decomposition of ammonia into hydrogen. The rare-earth/NiO/$Al_2O_3$ nanocomposite material is in the form of rare-earth doped NiO nanoparticles distributed on a $Al_2O_3$ matrix. The rare-earth doped NiO nanoparticles include a rare-earth dopant selected from the group consisting of La, Ce, Nd, Sm and combinations thereof, at a concentration of 1 to 20 weight % (wt. %) based on the total weight of the rare-earth/NiO/$Al_2O_3$ nanocomposite material. The rare-earth doped NiO nanoparticles are spherical with an average diameter in a range from 1 to 200 nanometer (nm). The rare-earth/NiO/$Al_2O_3$ nanocomposite material achieves a 90% or greater conversion of ammonia to hydrogen, based on the total amount of ammonia, at a temperature less than or equal to 550° C. when used to catalyze the decomposition of ammonia.

In some embodiments, the rare-earth doped NiO nanoparticles have an average diameter in a range from 3 to 100 nm.

In some embodiments, the rare-earth doped NiO nanoparticles have an average diameter in a range from 5 to 60 nm.

In some embodiments, the rare-earth doped NiO nanoparticles have an average diameter in a range from 10 to 50 nm.

In some embodiments, the rare-earth doped NiO nanoparticles have an average diameter of 30 nm.

In some embodiments, the rare-earth/NiO/$Al_2O_3$ nanocomposite material achieves a 90% or greater conversion of ammonia to hydrogen, based on the total amount of ammonia, at a temperature less than or equal to 540° C. when used to catalyze the decomposition of ammonia.

In some embodiments, the rare-earth/NiO/$Al_2O_3$ nanocomposite material achieves a 90% or greater conversion of ammonia to hydrogen, based on the total amount of ammonia, at a temperature less than or equal to 530° C. when used to catalyze the decomposition of ammonia.

In some embodiments, the rare-earth/NiO/$Al_2O_3$ nanocomposite material achieves a 90% or greater conversion of ammonia to hydrogen, based on the total amount of ammonia, at a temperature less than or equal to 520° C. when used to catalyze the decomposition of ammonia.

In some embodiments, the rare-earth/NiO/$Al_2O_3$ nanocomposite material achieves a 90% or greater conversion of ammonia to hydrogen, based on the total amount of ammonia, at a temperature less than or equal to 510° C. when used to catalyze the decomposition of ammonia.

In some embodiments, the rare-earth/NiO/$Al_2O_3$ nanocomposite material achieves a 100% conversion of ammonia to hydrogen, based on the total amount of ammonia, at a temperature of 600° C. with a gas hourly speed velocity (GHSV) of 20,400 mL/gram catalyst/h when used to catalyze the decomposition of ammonia.

In some embodiments, the rare-earth/NiO/Al$_2$O$_3$ nanocomposite material maintains a 100% conversion of ammonia to hydrogen, based on the total amount of ammonia, for 10 or more hours.

In some embodiments, the rare-earth/NiO/Al$_2$O$_3$ nanocomposite material maintains a 100% conversion of ammonia to hydrogen, based on the total amount of ammonia, for 20 or more hours.

In some embodiments, the rare-earth/NiO/Al$_2$O$_3$ nanocomposite material maintains a 95% or greater conversion of ammonia to hydrogen, based on the total amount of ammonia, for 60 or more hours.

In some embodiments, the rare-earth/NiO/Al$_2$O$_3$ nanocomposite material maintains a 97.5% or greater conversion of ammonia to hydrogen, based on the total amount of ammonia, for 60 or more hours.

In some embodiments, the rare-earth doped NiO nanoparticles includes the rare-earth dopant at a concentration of 3 to 10 wt. % based on the total weight of the rare-earth/NiO/Al$_2$O$_3$ nanocomposite material.

In some embodiments, the rare-earth doped NiO nanoparticles includes the rare-earth dopant at a concentration of 3 to 5 wt. % based on the total weight of the rare-earth/NiO/Al$_2$O$_3$ nanocomposite material.

In some embodiments, the rare-earth dopant is lanthanum (La).

In some embodiments, the rare-earth dopant is cerium (Ce).

In some embodiments, the rare-earth dopant is neodymium (Nd).

In some embodiments, the rare-earth dopant is samarium (Sm).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
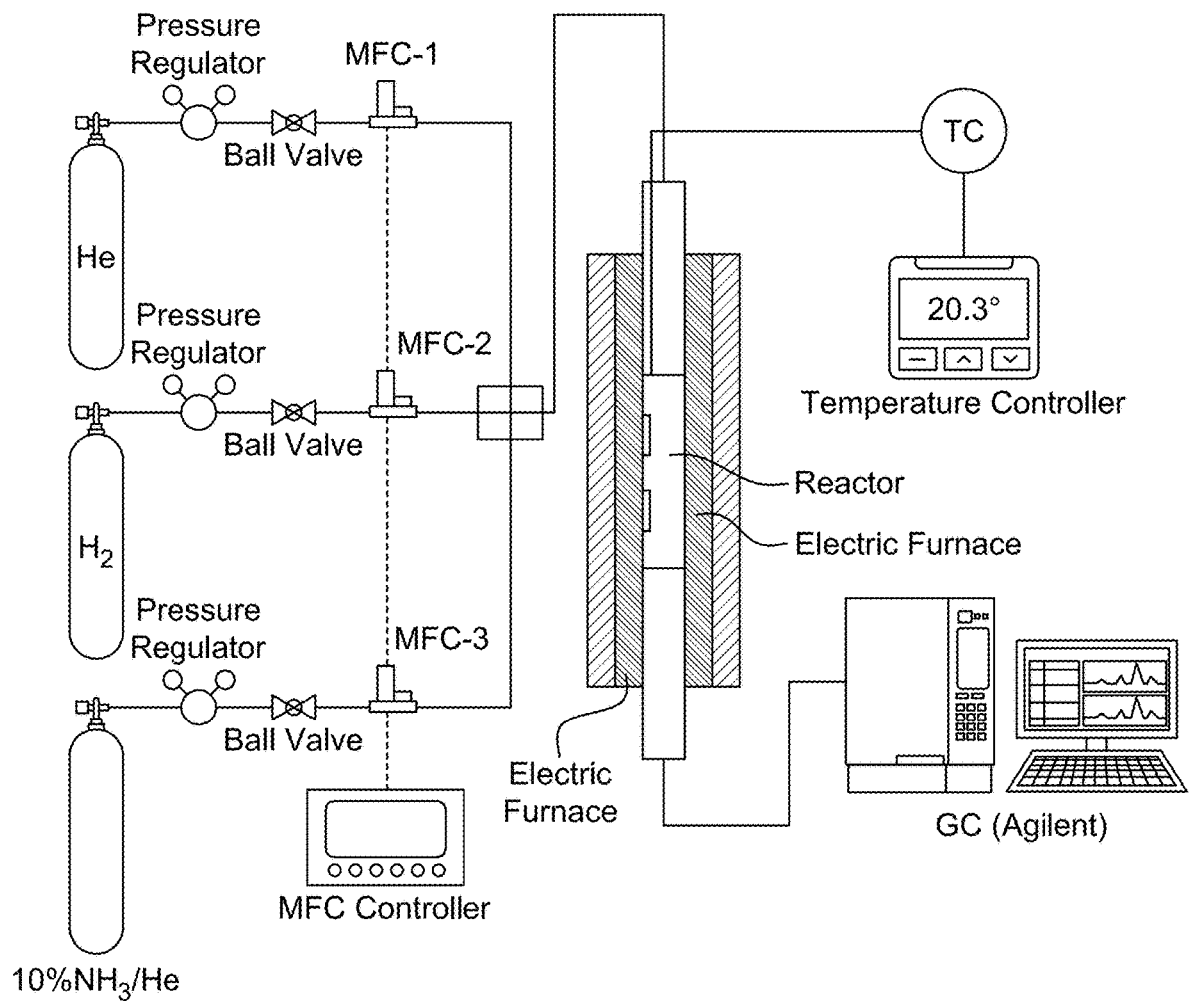
FIG. 1 is a schematic representation of the experimental setup, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nanometers.

As used herein, the term 'rare earth metal' refers to a group of chemical elements in the lanthanide series, as well as scandium and yttrium, which exhibit similar chemical properties and are commonly used in catalysts, magnets, phosphors, and electronic materials.

As used herein, the term 'gas hourly space velocity' refers to a measure of the volumetric flow rate of a gas through a reactor relative to the volume of the catalyst bed, typically expressed in units of mL/gram catalyst/h or $h^{-1}$, and is used to evaluate catalyst performance and reaction throughput.

As used herein, the term 'dopant' refers to a substance introduced in small quantities into a material to modify its electrical, optical, structural, or catalytic properties, often by altering its electronic structure or introducing defect sites.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include 13C and 14C. Isotopes of oxygen include 16O, 17O, and 18O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

An aspect of the present disclosure is directed to a rare-earth/NiO/$Al_2O_3$ nanocomposite material, exhibiting stable catalysis for ammonia decomposition to hydrogen.

A nanocomposite material is described. The nanocomposite includes a rare earth metal, NiO and $Al_2O_3$. The rare-earth/NiO/$Al_2O_3$ nanocomposite material is in the form of rare-earth NiO nanoparticles distributed on a $Al_2O_3$ matrix. In some embodiments, the rare earth dopant may include, but is not limited to, praseodymium, europium, gadolinium, terbium, dysprosium, holmium, erbium, thulium, ytterbium, lutetium, scandium, yttrium, promethium, actinium, thorium, uranium, neptunium, plutonium, americium, and combinations thereof. In one or more preferred embodiments, the rare-earth doped NiO nanoparticles include a rare-earth dopant selected from the group consisting of La, Ce, Nd, Sm, and combinations thereof.

In some embodiments, the rare-earth doped NiO nanoparticles include the rare-earth dopant at a concentration ranging from 1 to 20 wt. %, preferably 1 to 18 wt. %, preferably 2 to 18 wt. %, preferably 2 to 16 wt. %, preferably 2 to 14 wt. %, preferably 3 to 12 wt. %, preferably 3 to 10 wt. %, preferably 3 to 5 wt. %, based on the total weight of the rare-earth/NiO/$Al_2O_3$ nanocomposite material. In a preferred embodiment, the rare-earth doped NiO nanoparticles include the rare-earth dopant at a concentration of 3 to 10 wt. %, based on the total weight of the rare-earth/NiO/$Al_2O_3$ nanocomposite material. In another preferred embodiment, the rare-earth doped NiO nanoparticles include the rare-earth dopant at a concentration of 3 to 5 wt. % based on the total weight of the rare-earth/NiO/$Al_2O_3$ nanocomposite material.

In some embodiments, the nanocomposite material may include crystalline phases including, but not limited, to quartz, calcite, hematite, magnetite, goethite, dolomite, albite, anorthite, pyrite, fluorite, halite, barite, apatite, rutile, and zircon. In preferred embodiments, nanocomposite material includes a cubic NiO crystal phase, a $CeO_2$ crystal phase, a $Nd_2O_3$ crystal phase, and/or a $Sm_2O_3$ crystal phase. In some embodiments, the nanocomposite includes sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, the rare-earth doped NiO nanoparticles are spherical.

In some embodiments, the rare-earth doped NiO nanoparticles have an average diameter in a range from 0.5 to 400 nm, preferably 1 to 200 nm, preferably 5 to 100 nm, preferably 10 to 80 nm, preferably 15 to 70 nm, preferably 20 to 60 nm, preferably 20 to 50 nm, preferably 25 to 40 nm, preferably 25 to 35 nm, preferably 30 to 35 nm. In a preferred embodiment, the rare-earth doped NiO nanoparticles have an average diameter of 31.1 nm.

A method of producing hydrogen from ammonia is described. The method includes exposing ammonia to a rare-earth/NiO/$Al_2O_3$ nanocomposite material. The rare-earth/NiO/$Al_2O_3$ nanocomposite material catalyzes the decomposition of ammonia into hydrogen. In some embodiments, decomposition of ammonia may be conducted in a quartz tube reactor, packed bed reactor, fluidized bed reactor, membrane reactor, monolithic reactor, microchannel reactor, rotary kiln reactor, microwave-assisted reactor, catalytic wall reactor, plug flow reactor, continuous stirred tank reactor, batch reactor, multi-tubular reactor, trickle bed reactor, autothermal reactor, shell-and-tube reactor, loop reactor, isothermal reactor, and adiabatic reactor. In a preferred embodiment, decomposition of ammonia is conducted in a stainless-steel fixed bed tubular reactor.

In one or more embodiments, the ammonia is exposed to the rare-earth/NiO/$Al_2O_3$ nanocomposite material in a gas mixture. In some embodiments, concentration of ammonia in the gas mixture is in a range from 1 to 20 vol %, preferably 2 to 18 vol %, preferably 4 to 16 vol %, preferably 6 to 14 vol %, preferably 8 to 12 vol %, preferably 9 to 11 vol %, based on the total volume of the gas mixture. In a preferred embodiment, the concentration of ammonia in the gas mixture is 10 vol %, based on the total volume of the gas mixture. In one or more embodiments, the balance of the gas mixture includes helium, argon, or mixtures thereof.

In some embodiments, the gas hourly speed velocity (GHSV) used in the exposing is in a range from 5,000 to 45,000 mL/gram catalyst/h, preferably 10,000 to 35,000 mL/gram catalyst/h, preferably 12,000 to 30,000 mL/gram catalyst/h, preferably 14,000 to 27,000 mL/gram catalyst/h, preferably 16,000 to 25,000 mL/gram catalyst/h, preferably 18,000 to 24,000 mL/gram catalyst/h, preferably 19,000 to 22,000 mL/gram catalyst/h. In a preferred embodiment, the GHSV used in the exposing is 20,400 mL/gram catalyst/h.

In some embodiments, the rare-earth/NiO/$Al_2O_3$ nanocomposite material catalyzes the decomposition of ammonia to achieve a 90% or greater conversion to hydrogen, based on the total amount of ammonia, at a temperature less than or equal to 600° C., preferably 550° C., preferably less than or equal to 545° C., preferably less than or equal to 540° C., preferably less than or equal to 535° C., preferably less than or equal to 530° C., preferably less than or equal to 525° C., or preferably less than or equal to 520° C. In a preferred embodiment, the rare-earth/NiO/$Al_2O_3$ nanocomposites exhibit enhanced performance, with 5% La/NiO/$Al_2O_3$ achieving a 90% ammonia conversion at 510° C., 5% Ce/NiO/$Al_2O_3$ achieving a 90% ammonia conversion at 525° C., 5% Sm/NiO/$Al_2O_3$ at 530° C., and 5% Nd/NiO/$Al_2O_3$ achieving a 90% ammonia conversion at 540° C.

In some embodiments, the rare-earth/NiO/$Al_2O_3$ nanocomposite material catalyzes the decomposition of ammonia to achieve a 75% or greater conversion to hydrogen, based on the total amount of ammonia, at a temperature less than or equal to 600° C., preferably 550° C., preferably less than or equal to 545° C., preferably less than or equal to 540° C., preferably less than or equal to 535° C., preferably less than or equal to 530° C., preferably less than or equal to 525° C., preferably less than or equal to 520° C., preferably less than or equal to 500° C., preferably less than or equal to 480° C. In a preferred embodiment, the rare-earth/NiO/$Al_2O_3$ nanocomposites exhibit enhanced performance, with 5% La/NiO/$Al_2O_3$ achieving a 75% ammonia conversion at 480° C., 5% Ce/NiO/$Al_2O_3$ achieving a 75% ammonia conversion at 500° C., 5% Sm/NiO/$Al_2O_3$ achieving a 75% ammonia conversion at 510° C., and 5% Nd/NiO/$Al_2O_3$ achieving a 75% ammonia conversion at 515° C.

In some embodiments, the rare-earth/NiO/$Al_2O_3$ nanocomposite material catalyzes the decomposition of ammonia to achieve a 50% or greater conversion to hydrogen, based on the total amount of ammonia, at a temperature less than or equal to 600° C., preferably 550° C., preferably less than or equal to 500° C., preferably less than or equal to 490° C., preferably less than or equal to 485° C., preferably less than or equal to 480° C., preferably less than or equal to 475° C., preferably less than or equal to 460° C., preferably less than or equal to 455° C., preferably less than or equal to 450° C. In a preferred embodiment, the rare-earth/NiO/$Al_2O_3$ nanocomposites exhibit enhanced performance, with 5% La/NiO/$Al_2O_3$ achieving a 50% ammonia conversion at 450° C., 5% Ce/NiO/$Al_2O_3$ achieving a 50% ammonia conversion at 470° C., 5% Sm/NiO/$Al_2O_3$ achieving a 50% ammonia conversion at 470° C., and 5% Nd/NiO/$Al_2O_3$ achieving a 50% ammonia conversion at 480° C.

In some embodiments, the rare-earth/NiO/$Al_2O_3$ nanocomposite material catalyzes the decomposition of ammonia to achieve a 25% or greater conversion to hydrogen, based on the total amount of ammonia, at a temperature less than or equal to 600° C., preferably 550° C., preferably less than or equal to 500° C., preferably less than or equal to 490° C., preferably less than or equal to 485° C., preferably less than or equal to 480° C., preferably less than or equal to 475° C., preferably less than or equal to 460° C., preferably less than or equal to 455° C., preferably less than or equal to 450° C., preferably less than or equal to 440° C., preferably less than or equal to 430° C., preferably less than or equal to 420° C., preferably less than or equal to 410° C. In a preferred embodiment, the rare-earth/NiO/$Al_2O_3$ nanocomposites exhibit enhanced performance, with 5% La/NiO/$Al_2O_3$ achieving a 25% ammonia conversion at 410° C., 5% Ce/NiO/$Al_2O_3$ achieving a 25% ammonia conversion at 430° C., 5% Sm/NiO/$Al_2O_3$ achieving a 25% ammonia conversion at 430° C., and 5% Nd/NiO/$Al_2O_3$ achieving a 25% ammonia conversion at 450° C.

In some embodiments, the rare-earth/NiO/$Al_2O_3$ nanocomposite material catalyzes the decomposition of ammonia to achieve a 100% conversion to hydrogen, based on the total amount of ammonia, at a temperature of 700° C., and preferably 650° C., preferably 600° C., preferably 550° C., preferably 500° C., with a gas hourly space velocity (GHSV) of 20,400 mL/$g_{cat}$/h. The conversion may preferably reach 95%, preferably 94%, preferably 92%, preferably 90%, preferably 87%, preferably 85%, preferably 82%, preferably 80%, or preferably 75% under these conditions. In preferred embodiments, rare-earth-promoted nanocomposites, more specifically 5% La/NiO/$Al_2O_3$ and 5% Ce/NiO/$Al_2O_3$, achieve 100% ammonia conversion at 600° C. under a GHSV of 20,400 mL/g cat/h. At 500° C. and a GHSV of 20,400 mL/g cat/h, 5% La/NiO/$Al_2O_3$ and 5% Ce/NiO/$Al_2O_3$ demonstrate conversion efficiencies of 81.2% and 75.8%, respectively.

In some embodiments, the rare-earth/NiO/$Al_2O_3$ nanocomposite material maintains a conversion of ammonia to hydrogen at 100% based on the total amount of ammonia, for a duration of 4 or more hours, preferably 10 or more hours, preferably 12 or more hours, preferably 14 or more hours, preferably 16 or more hours, preferably 18 or more hours, preferably 20 or more hours. In a preferred embodiment, the rare-earth/NiO/$Al_2O_3$ nanocomposite, more preferably 5% La/NiO/$Al_2O_3$ and 5% Ce/NiO/$Al_2O_3$, maintains 100% ammonia conversion for 20 hours.

In further embodiments, the rare-earth/NiO/$Al_2O_3$ nanocomposite, more preferably 5% Ce/NiO/$Al_2O_3$, maintains a conversion of ammonia to hydrogen at 95% or greater for a duration of 40 hours or more, preferably 60 hours or more, preferably 61 hours, preferably 62 hours, preferably 63 hours, preferably 64 hours, or preferably 65 hours. In a preferred embodiment, 5% Ce/NiO/$Al_2O_3$ maintains a conversion of ammonia to hydrogen at 95% or greater for 65 hours.

The following examples are provided solely for illustration and are not to be construed as limitations of the present disclosure, as many variations thereof are possible without departing from the spirit and scope of the present disclosure.

Examples

The following examples demonstrate a method of producing hydrogen from ammonia. The examples are provided solely for illustration and are not to be construed as limitations of the present disclosure, as many variations thereof are possible without departing from the spirit and scope of the present disclosure.

Example 1: Fabrication of rare-earth/NiO/Al$_2$O$_3$catalyst

The catalysts were prepared using the dry mix method without using any solvent. Firstly, the Ni(NO$_3$)$_2$·6H$_2$O was added to Al$_2$O$_3$ and grinded with a mortar and pestle for 30 minutes. The resultant solid mixture was calcined at 500° C. in air with a temperature ramp of 5° C./min with a holding time of 5 h. The metal salt precursors for lanthanum (La), cerium (Ce), neodymium (Nd) and samarium (Sm) were added into the calcined mixture, and it was grinded again for homogeneous mixing. The final mixture was pyrolyzed again under an air atmosphere at 500° C. with a temperature ramp of 5° C./min with a holding time of 5 h.

Example 2: Characterization of Rare-Earth/NiO/Al$_2$O$_3$ Nanocomposites

The X-ray diffraction (XRD) patterns were recorded on a Rigaku model Ultima-IV diffractometer employing Cu-Kα radiation (λ=1.5406 Å) at 40 kV and 25 mA over a 2θ range between 5 and 90°. All XRD patterns were recorded in an air atmosphere. Crystallite size was determined using the Scherrer equation:

$$D = \frac{0.89\lambda}{\Delta\cos\theta} \quad (1)$$

where D refers to the crystal size in Å, λ=wavelength of the X-ray used, Δ=the full width at half maximum (FWHM) of the diffraction peak, and θ=the diffraction angle.

Scanning Electron Microscopy (SEM) samples were prepared by depositing ethanolic suspensions onto single-sided alumina tape mounted on alumina stubs. Elemental analysis and mapping were performed using energy-dispersive X-ray spectroscopy (EDS) with an attachment on the Lyra 3 SEM (Tescan, Czech Republic).

Transmission Electron Microscopy (TEM) images were acquired using a Titan (FEI) operating at 200 kV, equipped with a 4k×4k CCD camera (Ultra Scan 400SP, Gatan). High-resolution transmission electron microscopy (HR-TEM) images were captured on an image-corrected Titan (FEI) at a working voltage of 300 kV. For specimen preparation, a drop of ethanolic suspension was placed onto a copper grid and left to air dry at room temperature.

Physicochemical Characterization

The reducibility of the metal-based catalysts was assessed using hydrogen temperature-programmed reduction (H$_2$-TPR) with a BELCATII apparatus (Macrotrac BEL). In this procedure, 50 mg of catalyst was placed in a quartz reactor tube, purged under an argon flow of 50 mL/min at 500° C. for 30 minutes, and then cooled to 50° C. At this point, the gas feed was switched to a mixture of 10% hydrogen and 90% argon, flowing at rates of 5 mL/min and 45 mL/min, respectively, to establish the baseline. The temperature gradually increased to 900° C. at a rate of 10° C./min, with the signal being monitored using a thermal conductivity detector (TCD). Hydrogen desorption studies were conducted to evaluate the hydrogen uptake capacity of the catalysts. In these experiments, 50 mg of catalyst was loaded into a quartz reactor and preheated under an argon flow of 50 mL/min at 500° C. for 50 minutes. The temperature was then lowered to 40° C., and a hydrogen-argon mixture was introduced at flow rates of 5 mL/min hydrogen and 45 mL/min argon for 30 minutes to allow for saturation. Afterward, the sample was flushed with pure argon to remove any physiosorbed hydrogen. Finally, the temperature was raised to 700° C. at a heating rate of 10° C./min, and the TCD signal was recorded.

Example 3: Catalytic Evaluation

Experiments were conducted in a stainless-steel fixed bed tubular reactor for the decomposition of NH$_3$. 100 mg of a certain catalyst was loaded in the reactor and quartz wool plug was placed below the catalyst. The ammonia decomposition reactions were carried out in a transient temperature range of 350 to 600° C. with a ramp of 5° C./min under atmospheric pressure. The catalyst underwent a reduction process by exposing it to a hydrogen gas (H$_2$) stream at 350° C. and a flow rate of 30 ml/min for 2 h, with a ramp rate of 5° C. per minute before the experiment. Following the reduction step, any residual hydrogen gas was effectively purged using helium gas (He).

For the reaction, a diluted mixture of 10 vol. % NH$_3$ with a balance of He gas was introduced into the catalyst bed. The flow rate of the mixture through the catalyst bed was set at 34 ml/min, corresponding to an equivalent space velocity of 20,400 mL/g$_{cat}$/h. The conversion of NH$_3$ was calculated continuously every 5 mins using the online Agilent GC according to the following formula, $$\text{NH}_3 \text{ conversion } \% = \frac{\text{NH}_{3,in} - \text{NH}_{3,out}}{\text{NH}_{3,in}} \times 100 \quad (2)$$

Example 4: Activity Evaluation Apparatus

A fixed bed tube reactor is used for NH$_3$ decomposition which consists of tubular reactor, heater, furnace, flow meters, online GC and gas sources (10% NH$_3$ in Helium, hydrogen, and helium) as shown in FIG. 1. The tubular reactor is made of stainless steel (316) with an internal diameter of 12.7 millimeters (mm) and a length of 280 mm. The two K-type thermocouples with thickness of 3.175 mm were installed to monitor the temperature of the reactor and heater. Three flowmeters were used to control the flow of 10% NH$_3$ in He, Hydrogen (H$_2$), and Helium (He) during the experiment. The products were analyzed using an online Agilent 7890B gas chromatograph (GC) equipped with a thermal conductivity detector (TCD). The GC analysis was performed isothermally at 50° C. using an HP-PLOT U column (30 meters in length, 0.32 mm internal diameter). Helium gas served as the carrier gas for the gas composition analysis.

The required amount of nitrate salts of the Ni precursors was added to 3 g of Al$_2$O$_3$ and ground in a mortar and pestle for 30 minutes. The resulting mixture was then calcined at 500° C. This simple and cost-effective dry-mixing method for catalyst preparation resulted in an increased BET surface area. In contrast, the commonly used wet impregnation method can block the pores of Al$_2$O$_3$ with ultrasmall metal-oxide nanoparticles, leading to a reduced surface area and fewer active sites. Additionally, the dry-mixing technique offers advantages such as homogeneous distribution of the metal components, ease of preparation, control over catalyst composition, and greater potential for scalability, making it a commercially attractive option for industrial applications.

Figure 2:
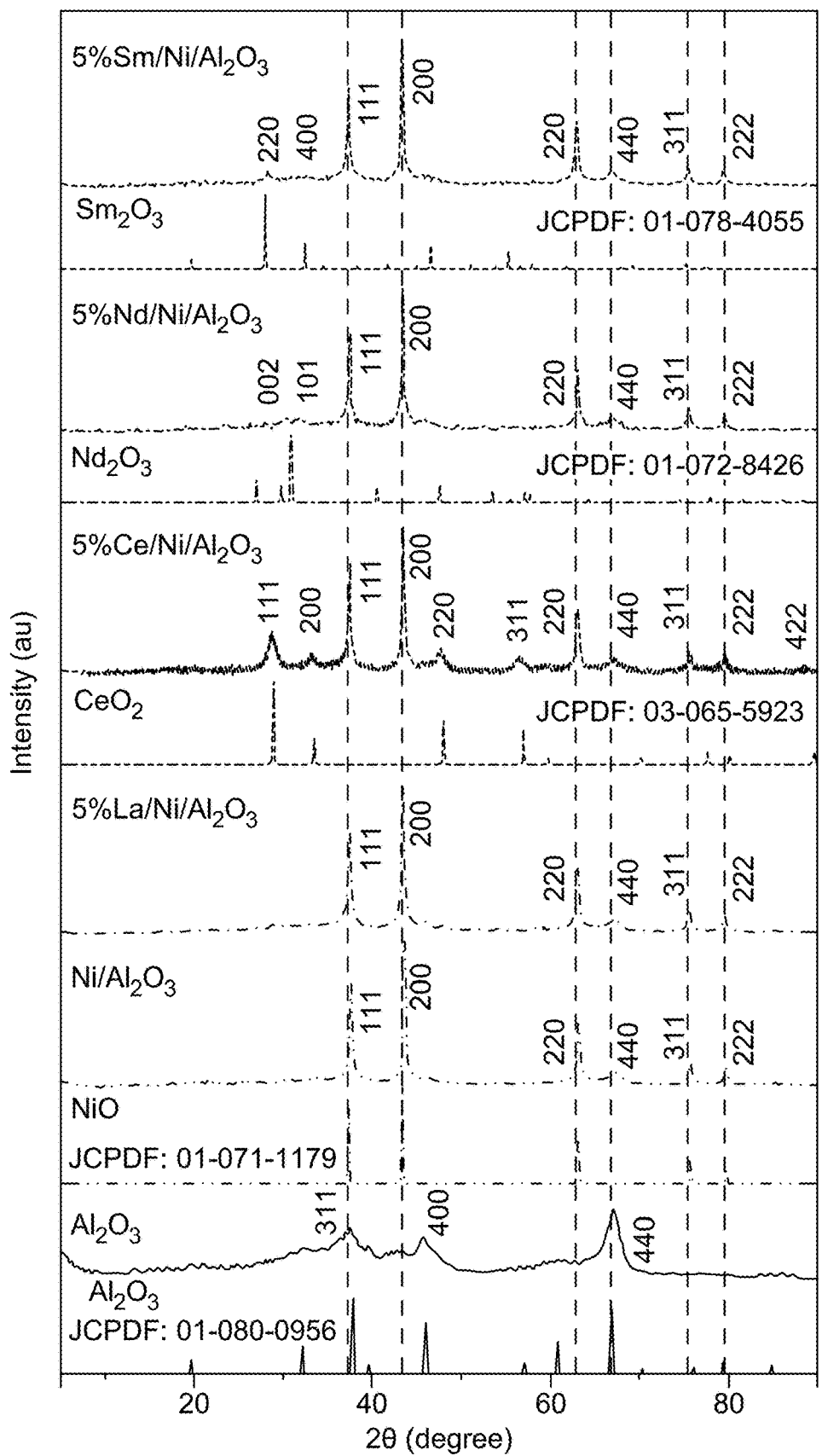
FIG. 2 is an X-ray diffraction (XRD) pattern of Al$_2$O$_3$, NiO, Ni/Al$_2$O$_3$, 5% La/Ni/Al$_2$O$_3$, CeO$_2$, 5% Ce/Ni/Al$_2$O$_3$, Nd$_2$O$_3$, 5% Nd/Ni/Al$_2$O$_3$, Sm$_2$O$_3$, 5% Sm/Ni/Al$_2$O$_3$ catalyst, according to certain embodiments.
Figure 3A:
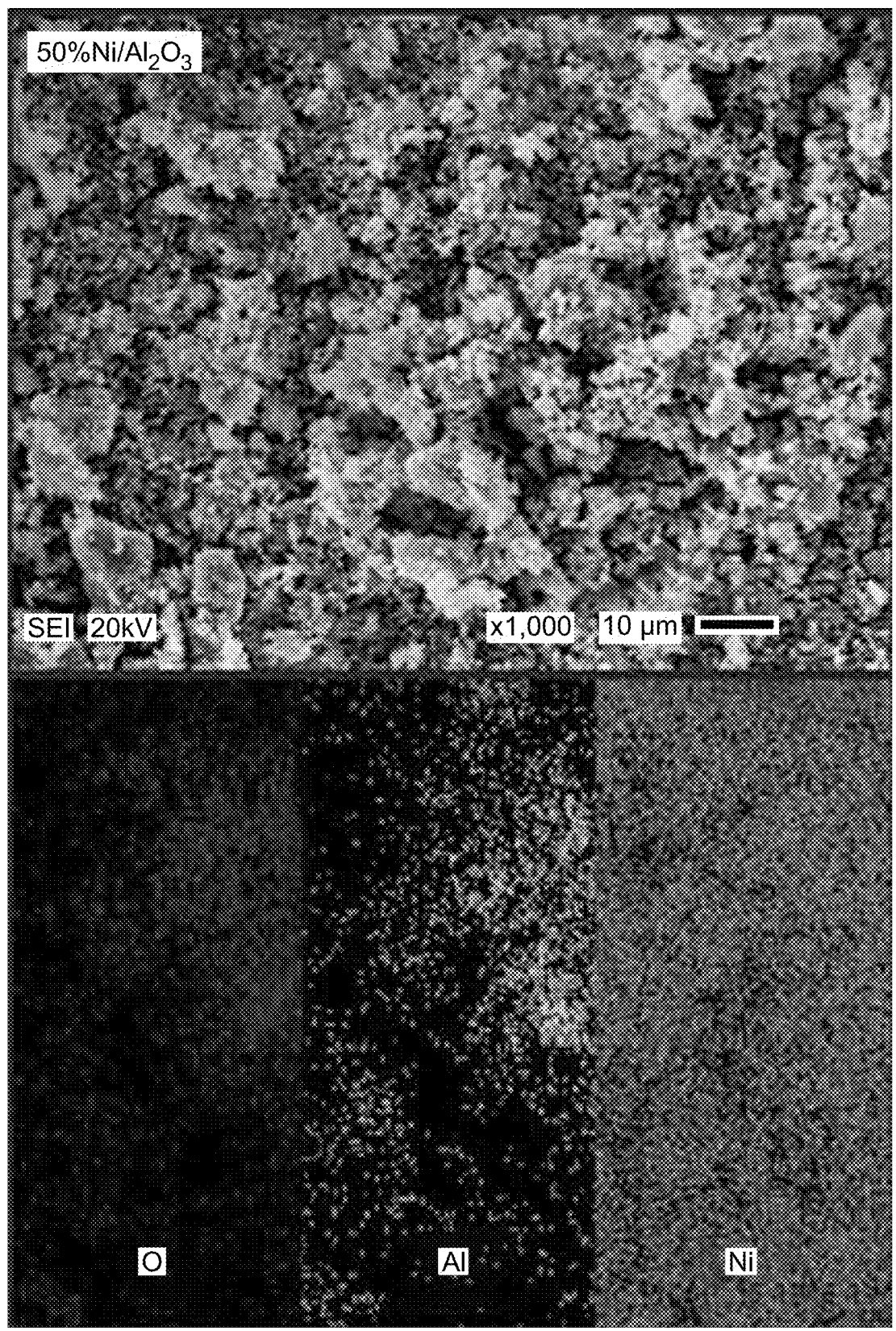
FIG. 3A is a scanning electron microscopy (SEM) image and elemental mapping depicting O, Al, Ni elements of 50% Ni/Al$_2$O$_3$ at 10 micrometer (μm) magnification, according to certain embodiments.
Figure 3B:
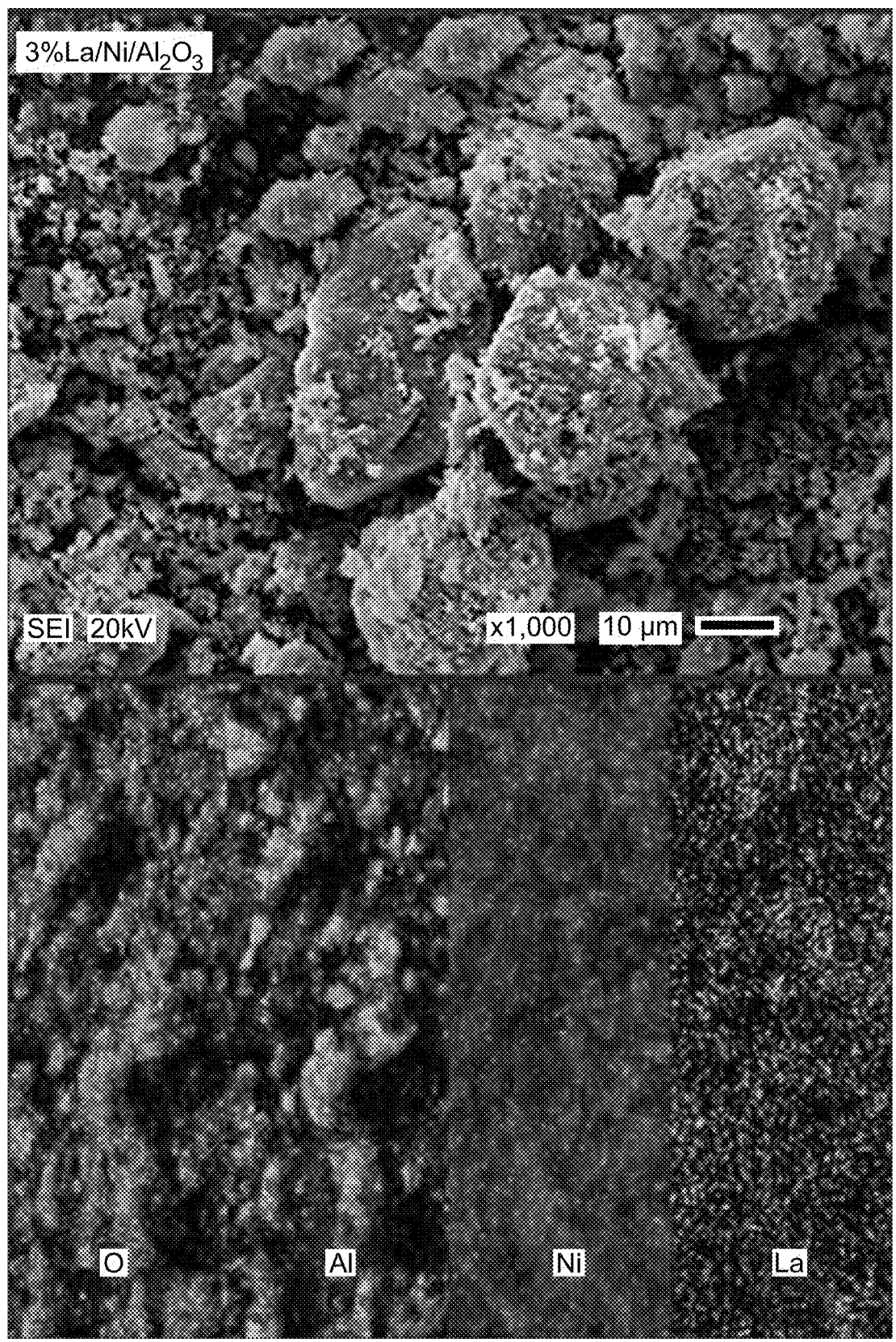
FIG. 3B is a SEM image and elemental mapping depicting O, Al, Ni, La elements of 3% La/Ni/Al$_2$O$_3$ at 10 μm magnification, according to certain embodiments.
Figure 3C:
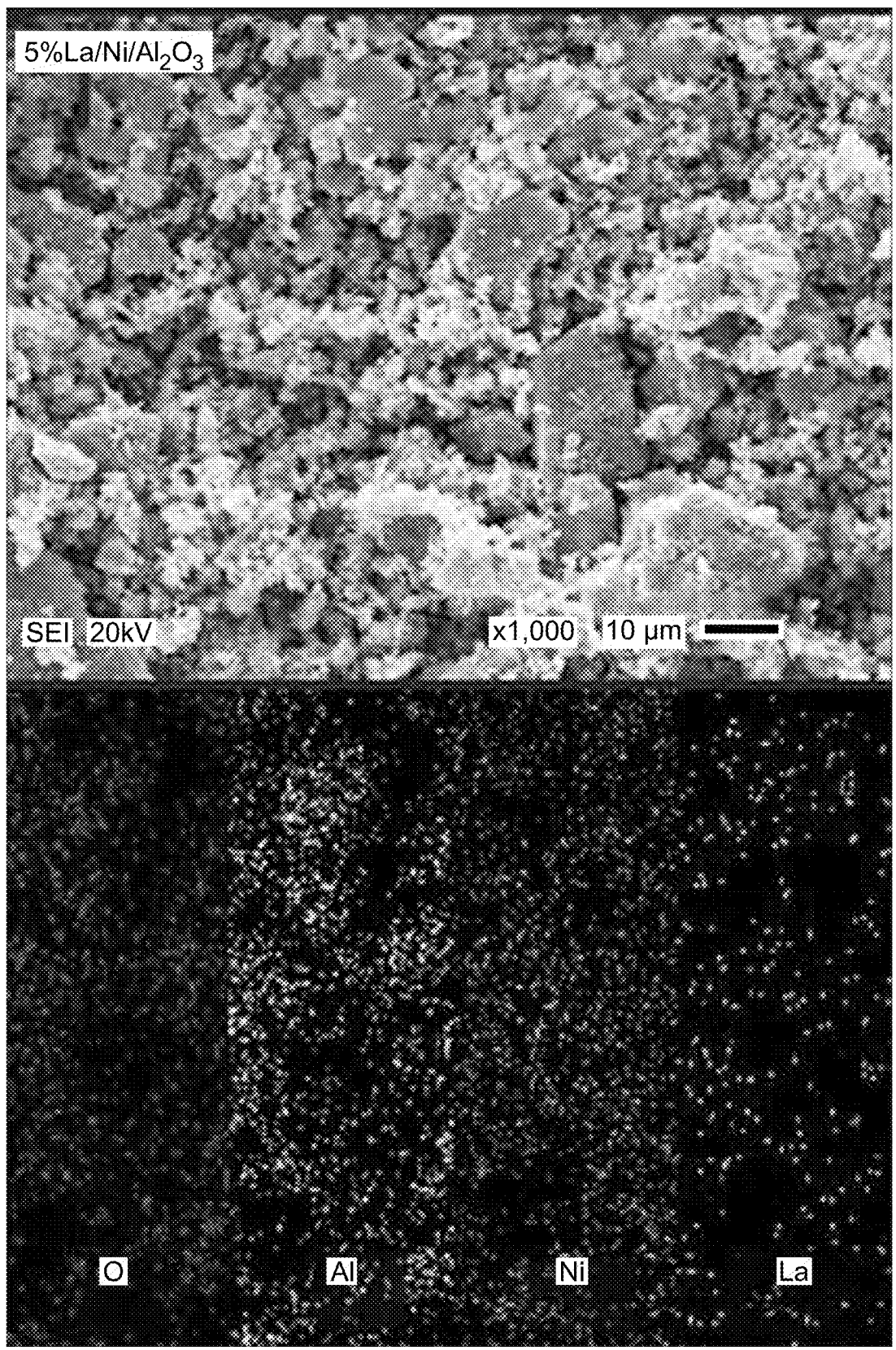
FIG. 3C is a SEM image and elemental mapping depicting O, Al, Ni, La elements of 5% La/Ni/Al$_2$O$_3$ at 10 μm magnification, according to certain embodiments.
Figure 3D:
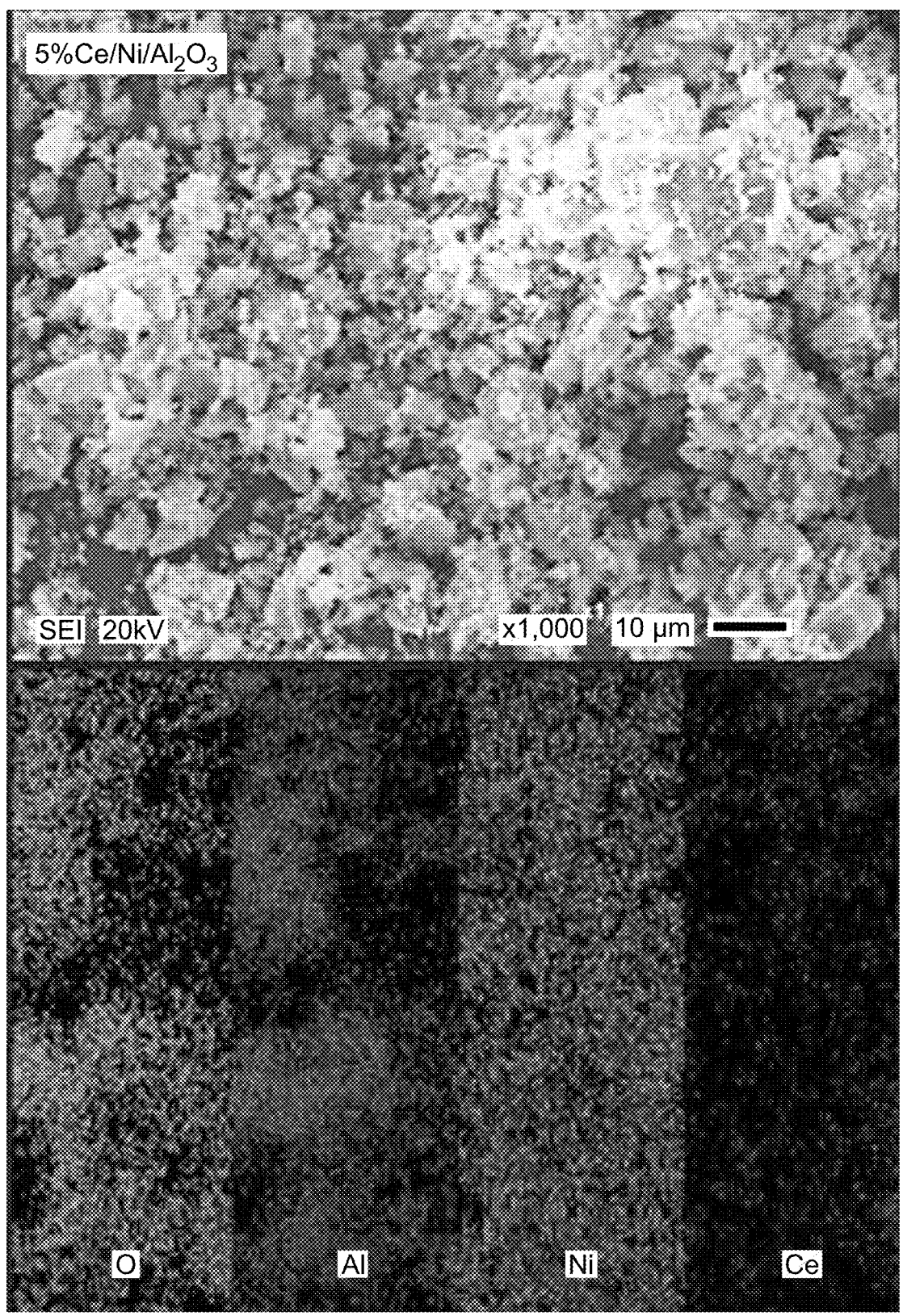
FIG. 3D is a SEM image and elemental mapping depicting O, Al, Ni, Ce elements of 5% Ce/Ni/Al$_2$O$_3$ at 10 μm magnification, according to certain embodiments.
Figure 3E:
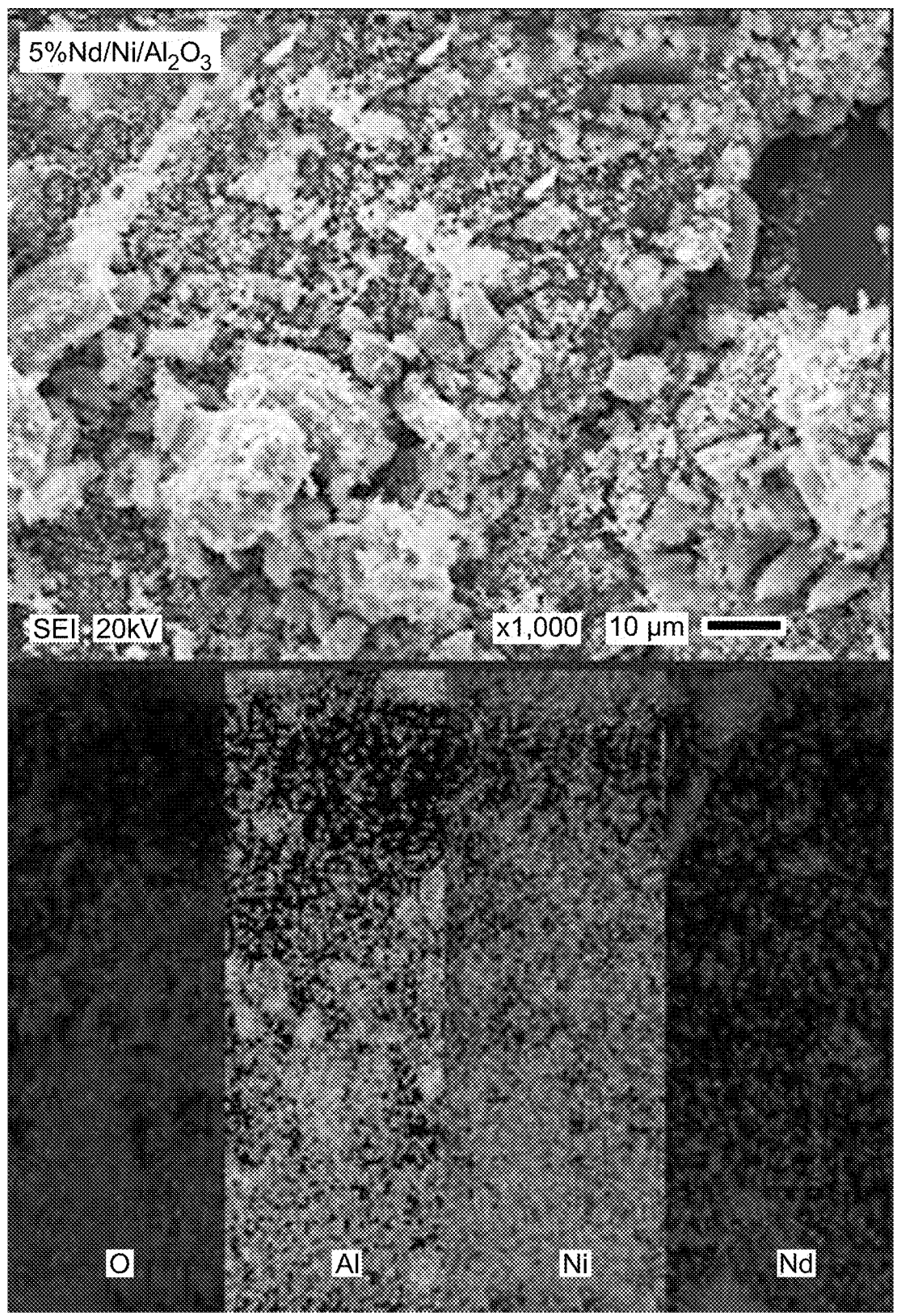
FIG. 3E is a SEM image and elemental mapping depicting O, Al, Ni, Nd elements of 5% Nd/Ni/Al$_2$O$_3$ at 10 μm magnification, according to certain embodiments.
Figure 3F:
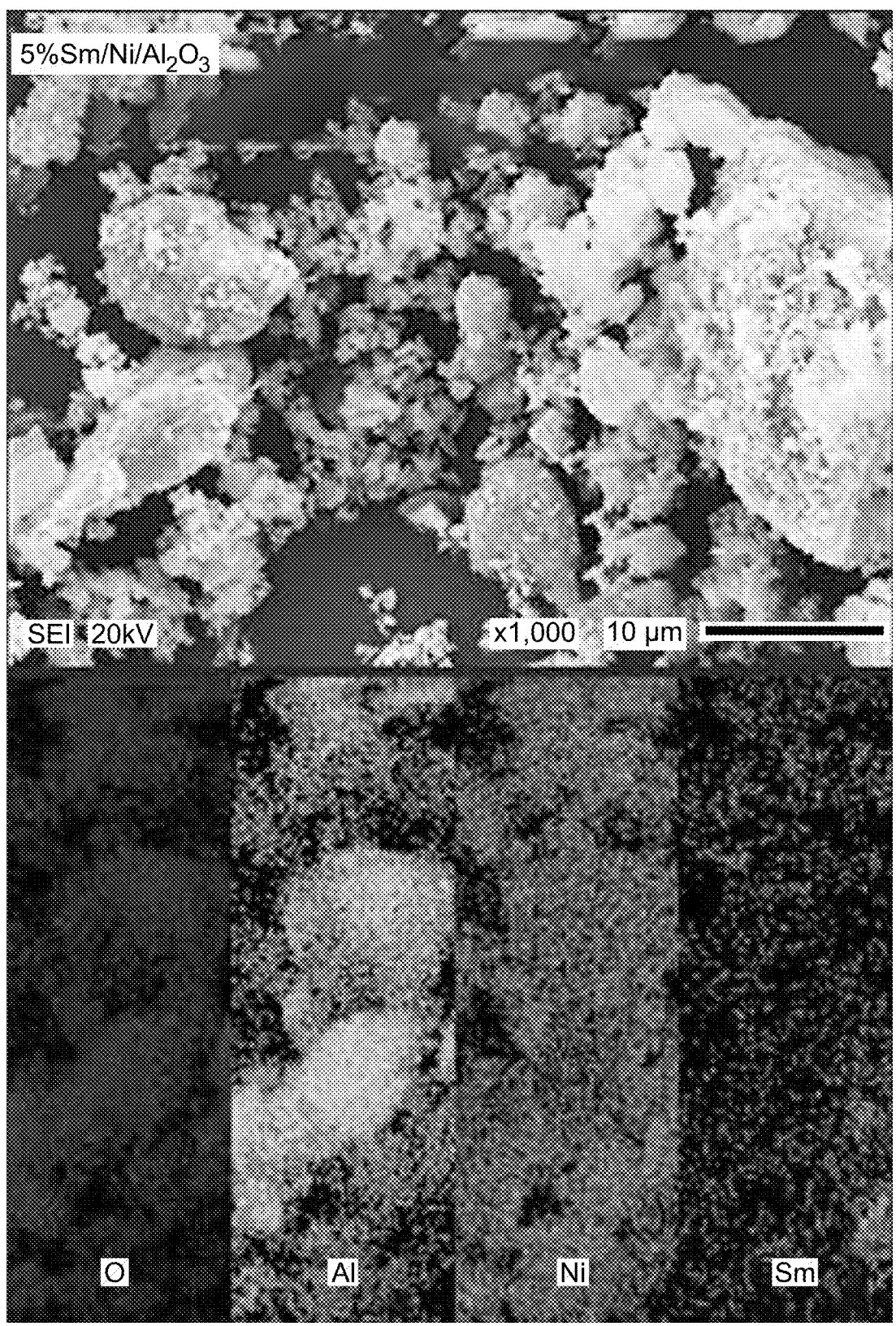
FIG. 3F is a SEM image and elemental mapping depicting O, Al, Ni, Sm elements of 5% Sm/Ni/Al$_2$O$_3$ at 10 μm magnification, according to certain embodiments.
Figure 4A:
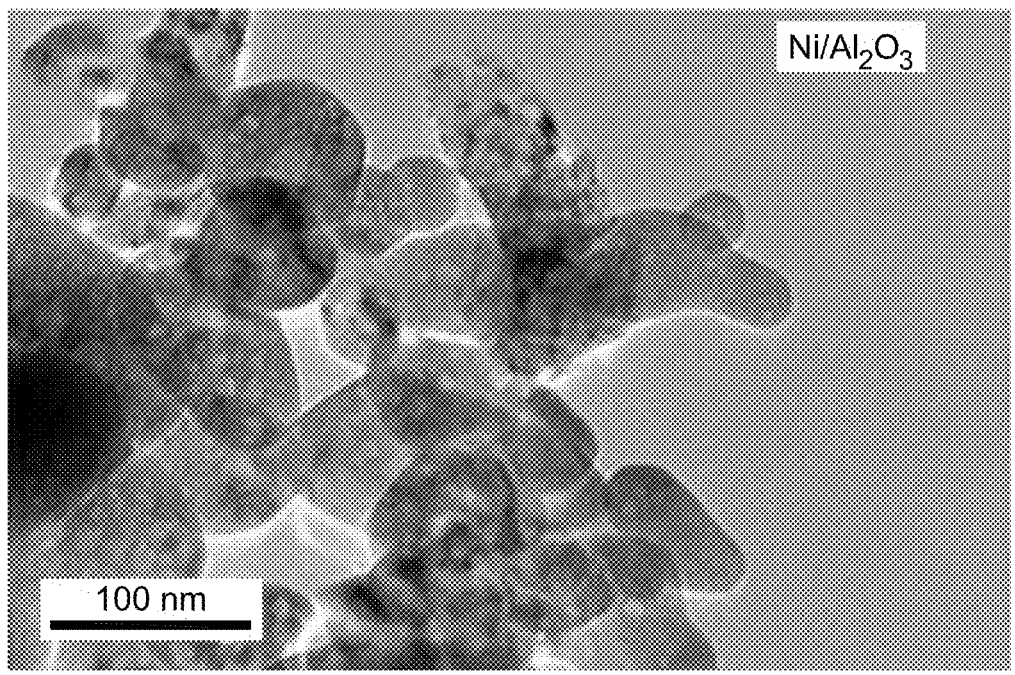
FIG. 4A is a transmission electron microscopy (TEM) image of Ni/Al$_2$O$_3$ at 100 nanometer (nm) magnification, according to certain embodiments.
Figure 4B:
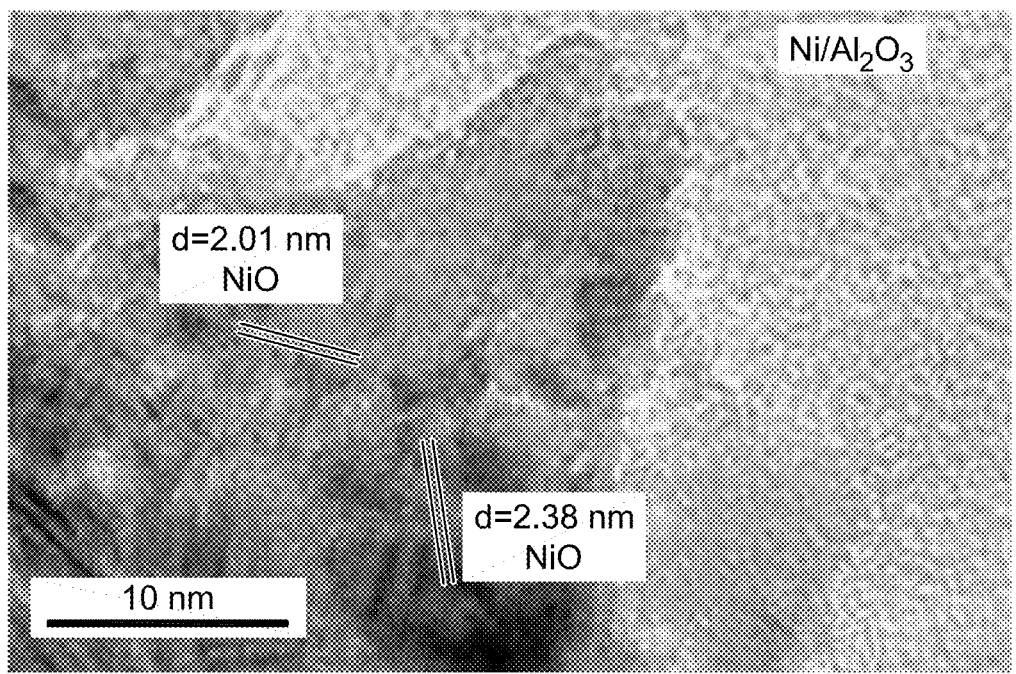
FIG. 4B is a high-resolution transmission electron microscopy (HRTEM) image of Ni/Al$_2$O$_3$ at 10 nm magnification, according to certain embodiments.
Figure 4C:
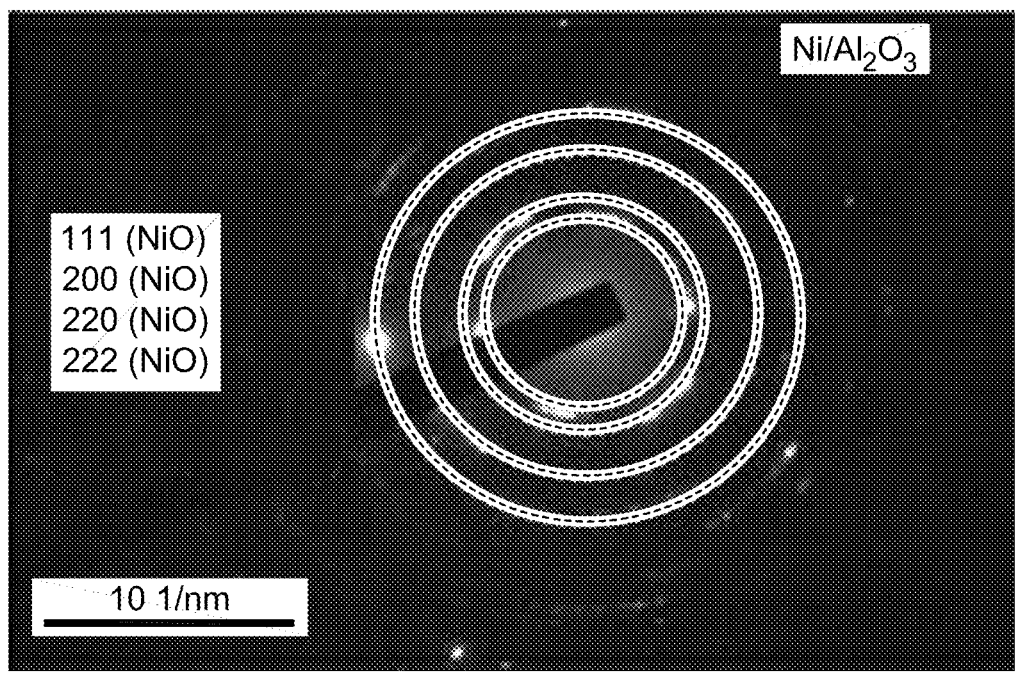
FIG. 4C is a selected area electron diffraction image of Ni/Al$_2$O$_3$ at 10 1/nm magnification, according to certain embodiments.
Figure 4D:
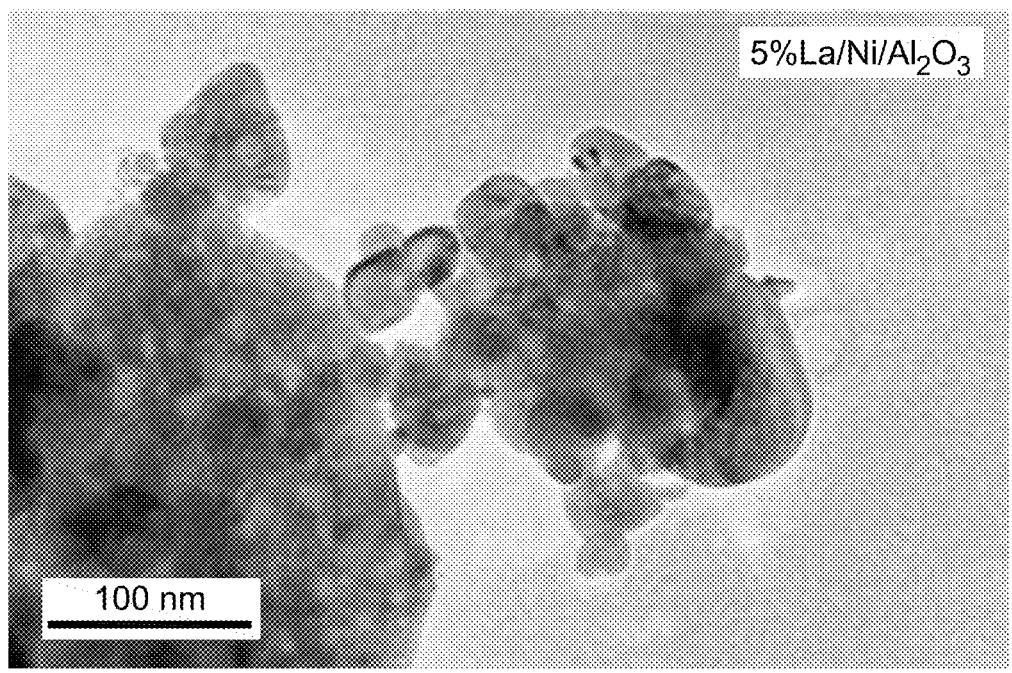
FIG. 4D is a TEM image of 5% La/Ni/Al$_2$O$_3$ at 100 nm magnification, according to certain embodiments.
Figure 4E:
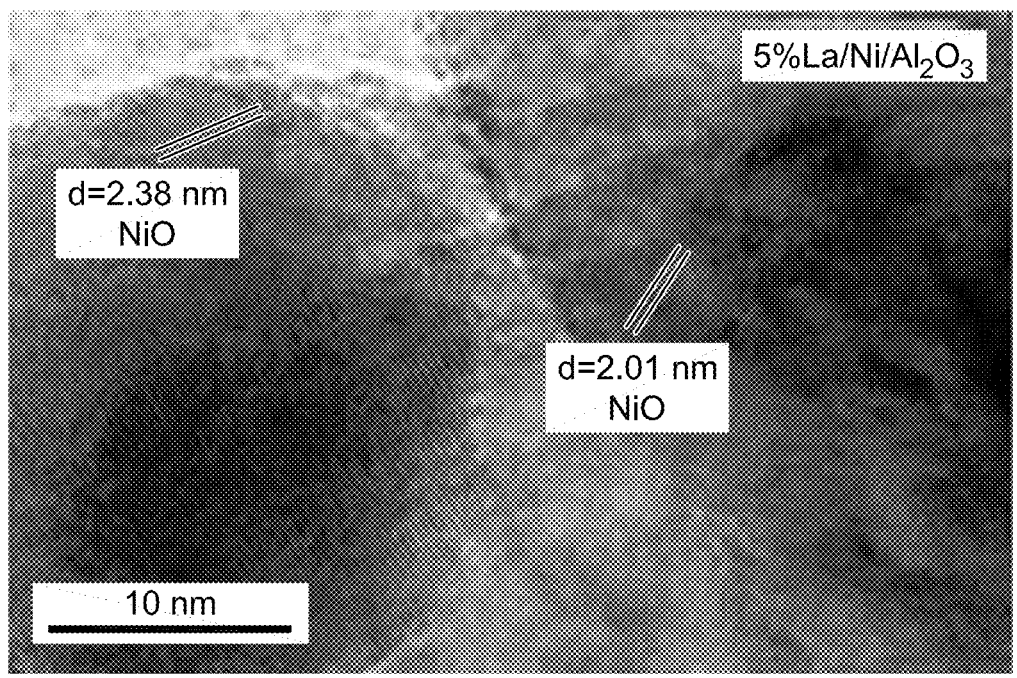
FIG. 4E is a HRTEM image of 5% La/Ni/Al$_2$O$_3$ at 10 nm magnification, according to certain embodiments.
Figure 4F:
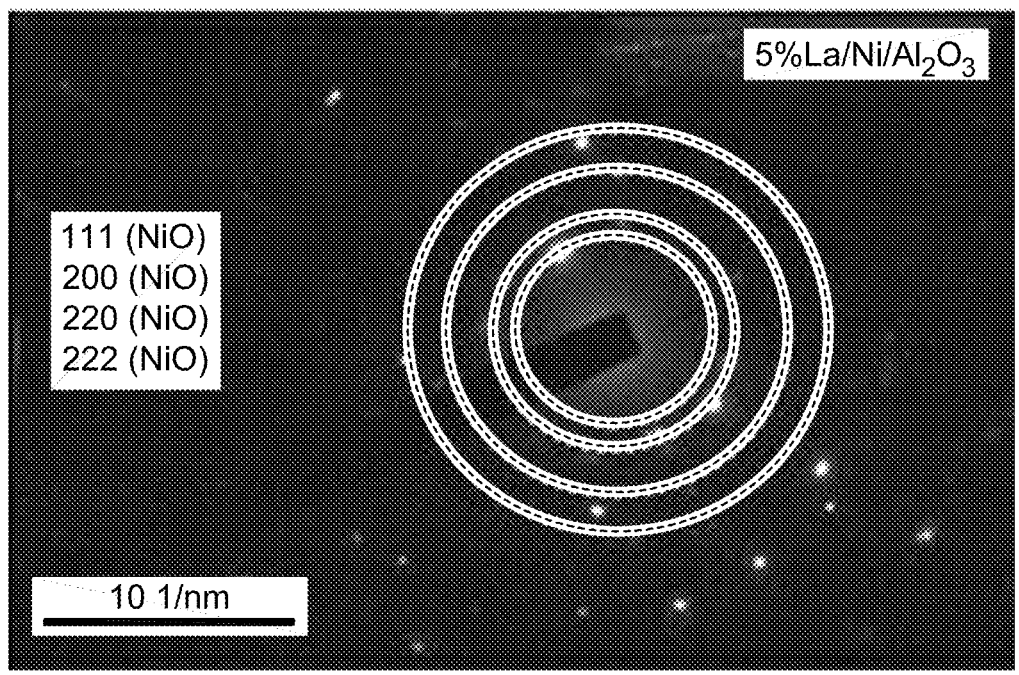
FIG. 4F is a SAED image of 5% La/Ni/Al$_2$O$_3$ at 10 1/nm magnification, according to certain embodiments.
Figure 4G:
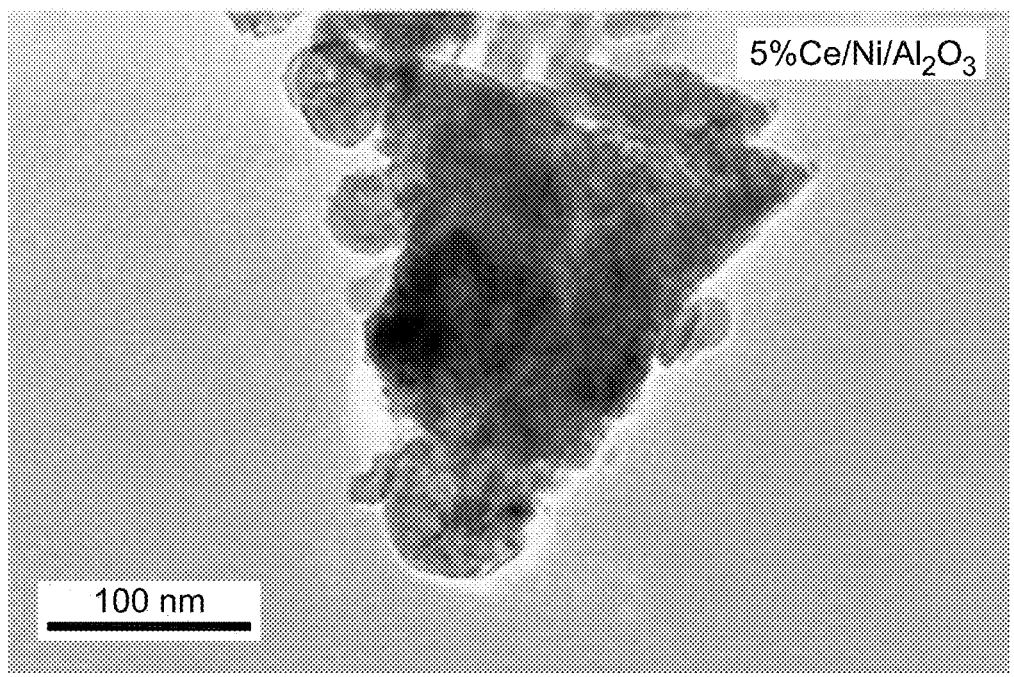
FIG. 4G is a TEM image of 5% Ce/Ni/Al$_2$O$_3$ at 100 nm magnification, according to certain embodiments.
Figure 4H:
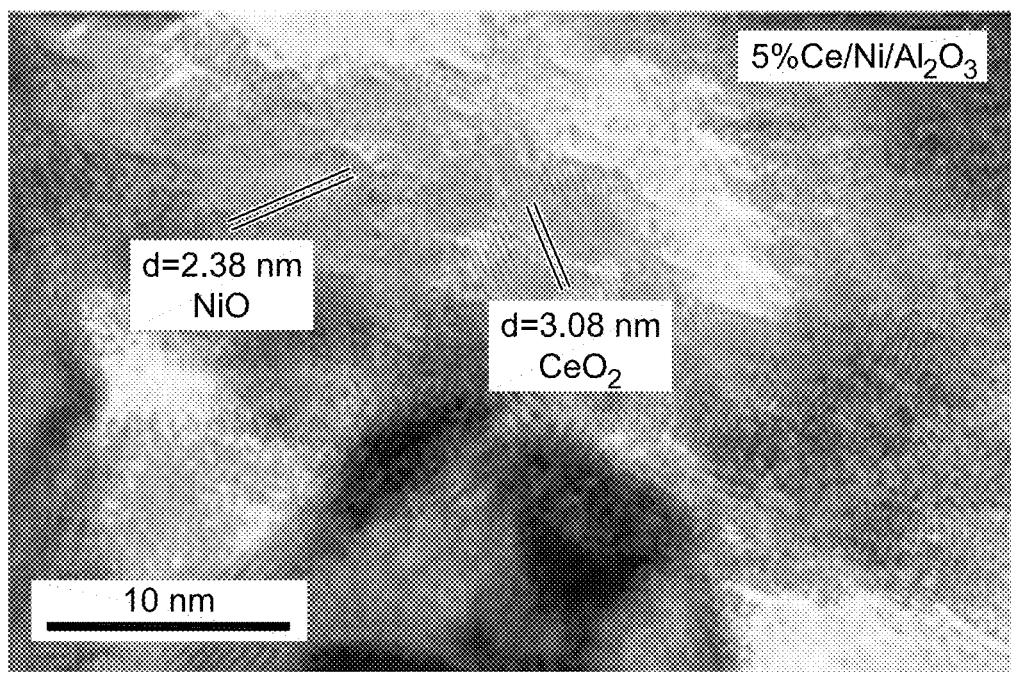
FIG. 4H is a HRTEM image of 5% Ce/Ni/Al$_2$O$_3$ at 10 nm magnification, according to certain embodiments.
Figure 4I:
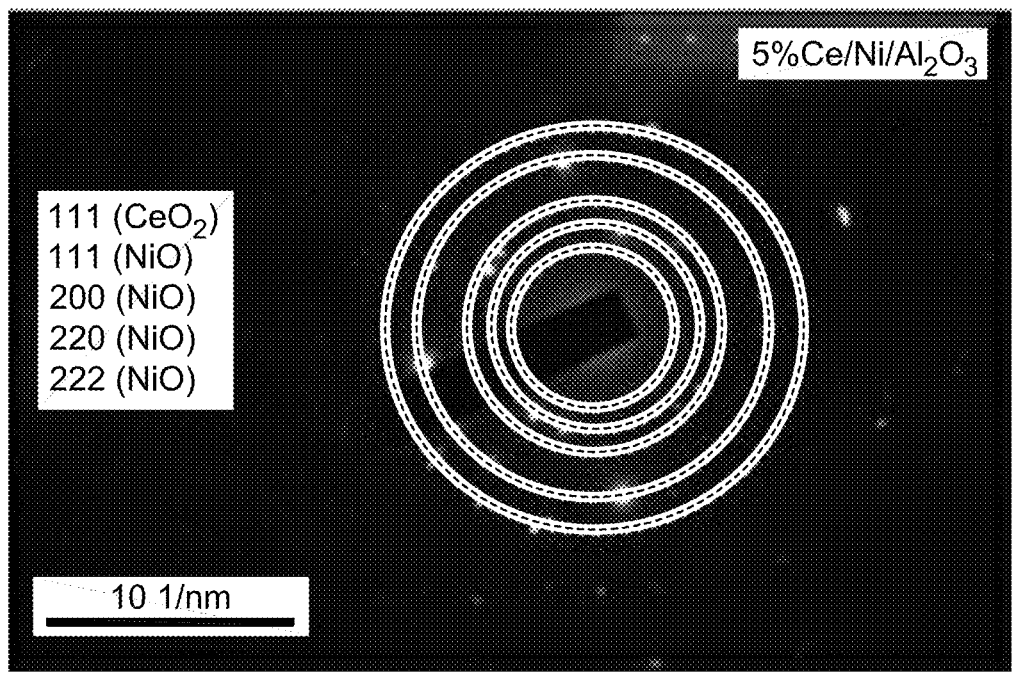
FIG. 4I is a SAED image of 5% Ce/Ni/Al$_2$O$_3$ at 10 1/nm magnification, according to certain embodiments.
Figure 4J:
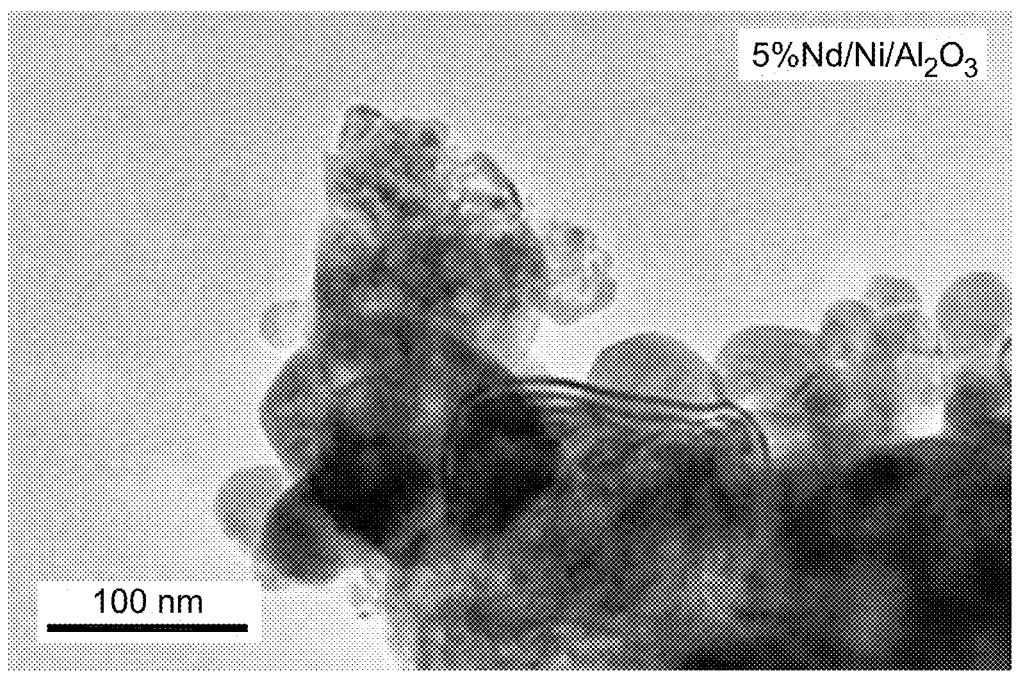
FIG. 4J is a TEM image of 5% Nd/Ni/Al$_2$O$_3$ at 100 nm magnification, according to certain embodiments.
Figure 4K:
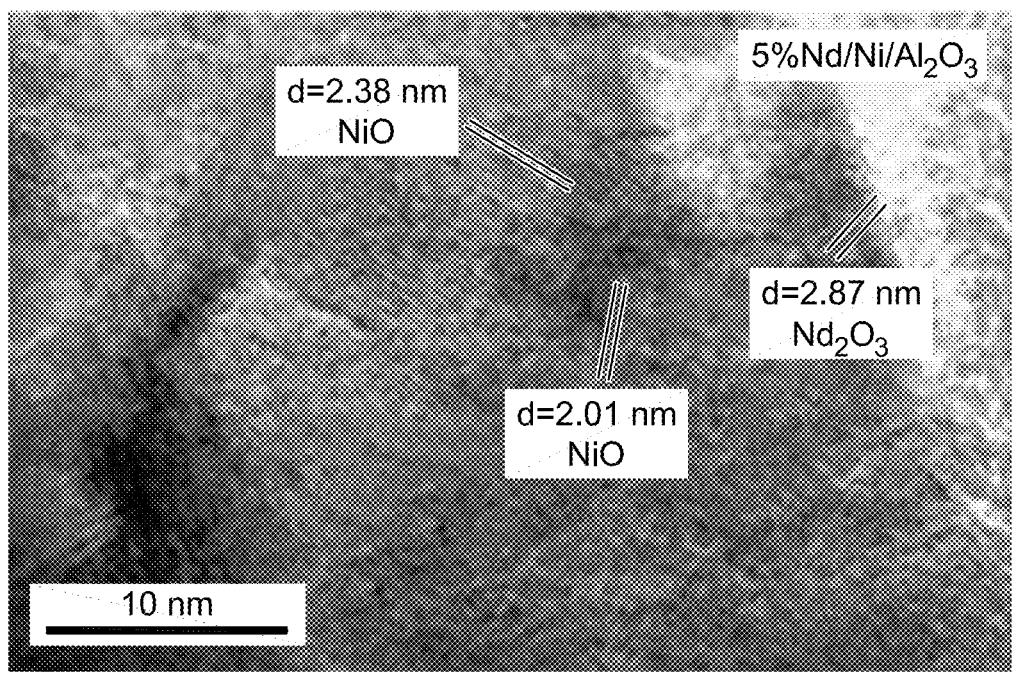
FIG. 4K is a HRTEM image of 5% Nd/Ni/Al$_2$O$_3$ at 10 nm magnification, according to certain embodiments.
Figure 4L:
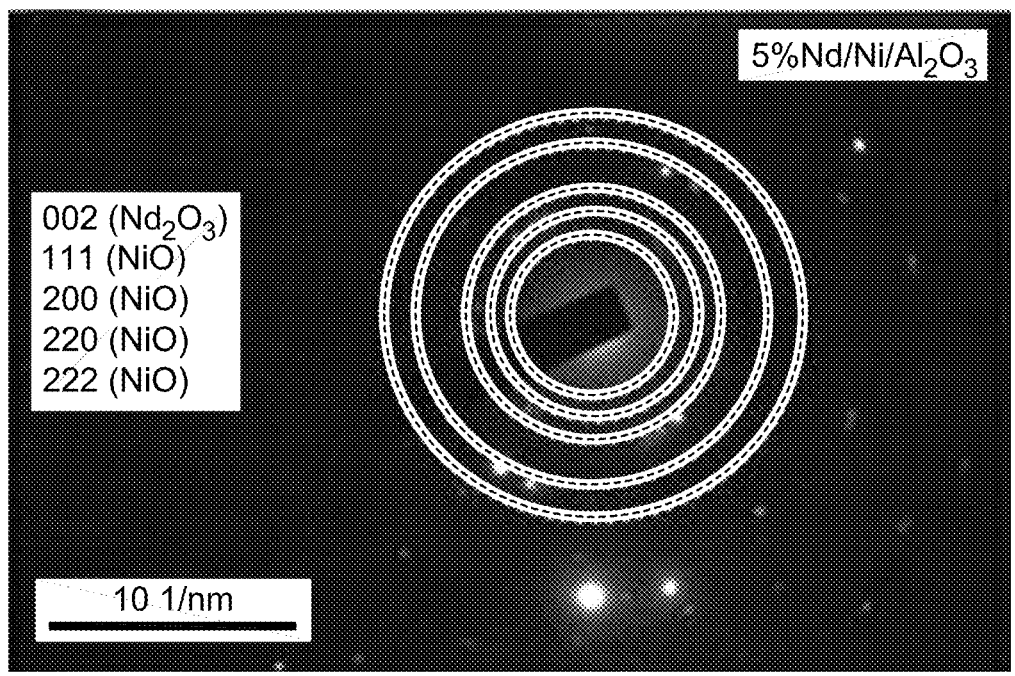
FIG. 4L is a SAED image of 5% Nd/Ni/Al$_2$O$_3$ at 10 1/nm magnification, according to certain embodiments.
Figure 4M:
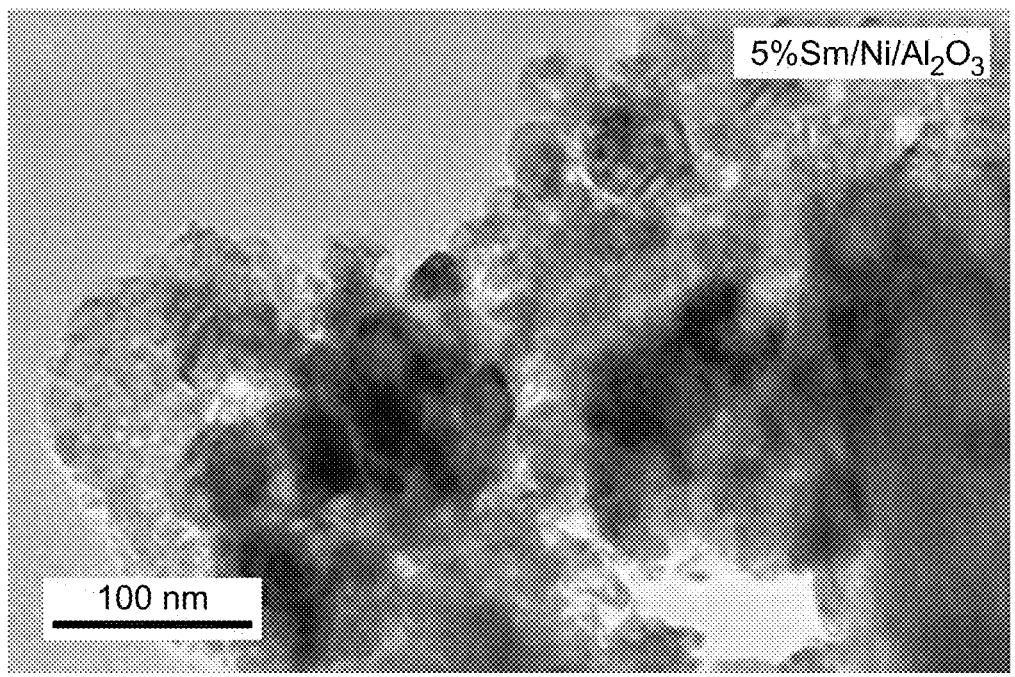
FIG. 4M is a TEM image of 5% Sm/Ni/Al$_2$O$_3$ at 100 nm magnification, according to certain embodiments.
Figure 4N:
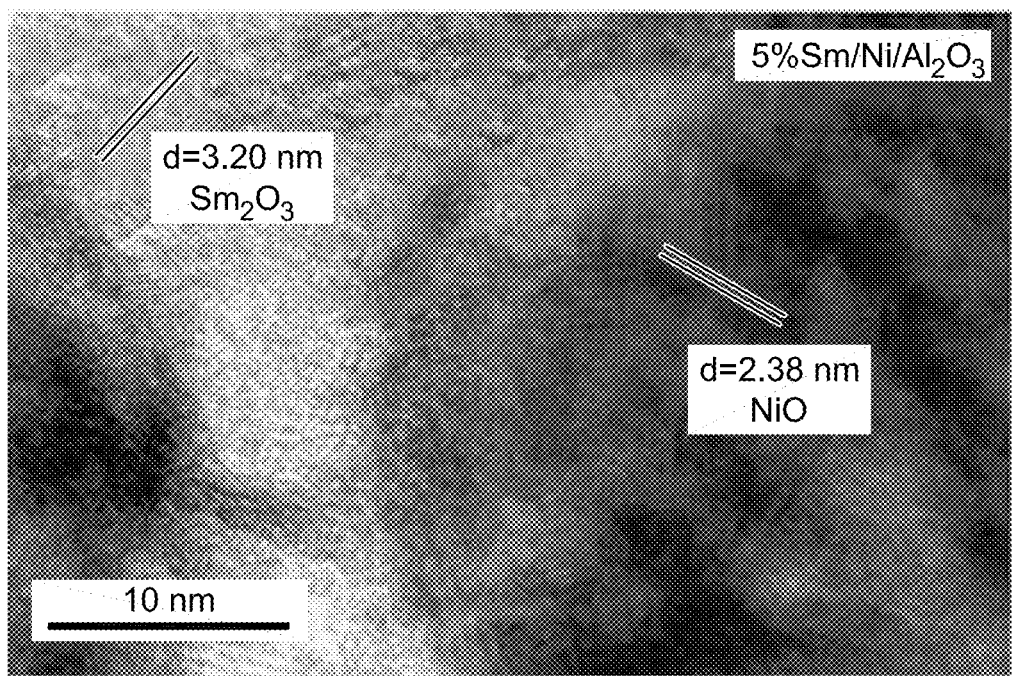
FIG. 4N is a HRTEM image of 5% Sm/Ni/Al$_2$O$_3$ at 10 nm magnification, according to certain embodiments.
Figure 4O:
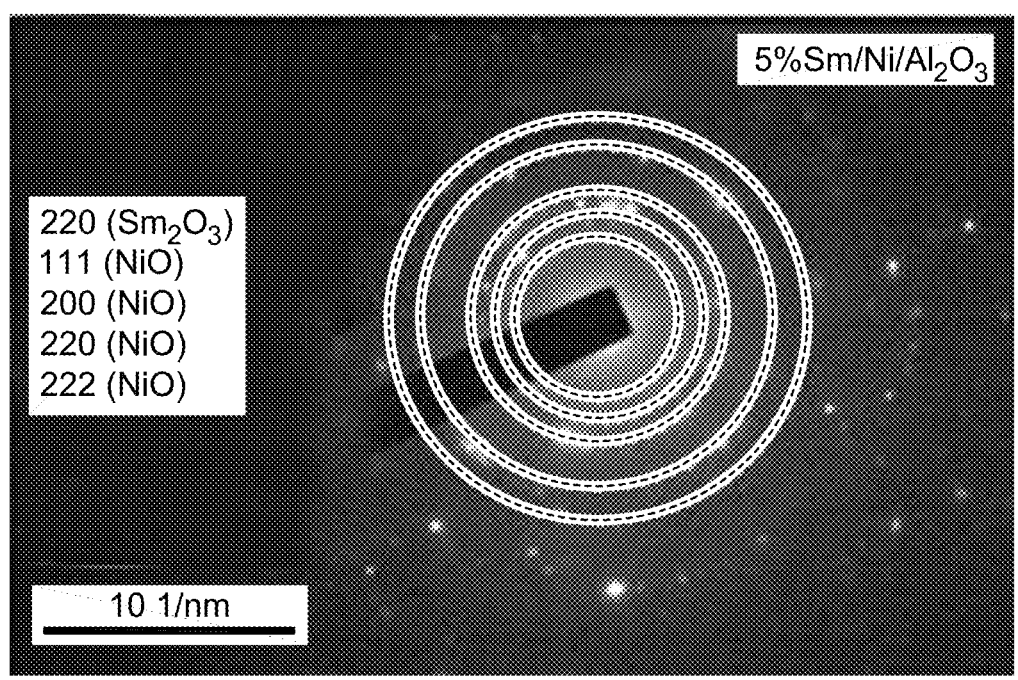
FIG. 4O is a SAED image of 5% Sm/Ni/Al$_2$O$_3$ at 10 1/nm magnification, according to certain embodiments.

The PXRD analysis of the 50% Ni/Al$_2$O$_3$, 5% La/Ni/Al$_2$O$_3$, 5% Ce/Ni/Al$_2$O$_3$, 5% Nd/Ni/Al$_2$O$_3$, and 5% Sm/Ni/Al$_2$O$_3$ samples is presented in FIG. 2. The catalysts were subjected to XRD characterization to obtain structural information. FIG. 2 shows the XRD patterns of Ni/Al$_2$O$_3$ and its corresponding La—, Ce—, Nd—, and Sm-impregnated samples, compared with pure Al$_2$O$_3$. The samples exhibit well-defined peaks, indicating high crystallinity. The diffraction patterns predominantly display peaks corresponding to alumina, NiO, and rare-earth oxides.

The crystalline structure of the NiO nanoparticles dispersed on the Al$_2$O$_3$ surface was analyzed using X-ray diffraction (XRD). The XRD patterns of the calcined 50% Ni/Al$_2$O$_3$ confirm the formation of phase-pure cubic NiO with a rock salt structure (Bunsenite, NaCl-type structure). The sharp diffraction peaks at 2θ values of 37.23°, 43.26°, 62.84°, 75.37°, and 79.36° are indexed to the (111), (200), (220), (311), and (222) planes, respectively, which clearly indicate the cubic crystalline nature of the nanoparticles (JCPDS PDF #01-071-1179) (Habibi, N., et al., CH$_4$ reforming with CO$_2$ for syngas production over La$_2$O$_3$ promoted Ni catalysts supported on mesoporous nanostructured γ-Al$_2$O$_3$, *Journal of Energy Chemistry*, Volume 23, Issue 4, 2014, pages 435-442). The crystallite size of the nanoparticles was calculated using the Scherrer equation (t=Kλ/Bcosθ) where t is the crystallite size, K is the shape factor (typically 0.9), λ is the wavelength of the Cu Kα radiation (0.154 nm), B is the full width at half maximum (FWHM) of the diffraction peak, and θ is the Bragg angle. Based on this formula, the average crystallite size of the NiO nanoparticles was determined to be 31.1 nm. In addition, the XRD spectra of the Ni/Al$_2$O$_3$ catalysts doped with La, Ce, Nd, and Sm exhibit extra low-intensity diffraction peaks at 28.48° and 33°, attributed to the (111) and (200) CeO$_2$ crystal planes (JCPDS PDF #03-065-5923); 29.30° and 30.54°, corresponding to the (002) and (101) Nd$_2$O$_3$ crystal planes (JCPDS PDF #01-072-8426); and 22.46° and 33.97°, attributed to the (220) and (400) Sm$_2$O$_3$ crystal planes (JCPDS PDF #01-078-4055), respectively. Some unknown phases are also present, potentially corresponding to La/Ce/Nd/Sm-based oxides, NiO-related phases, or complex La/Ce/Nd/Sm—Ni—Al oxides. The low intensity of the rare-earth metal oxide peaks is likely due to the low concentration of metal oxide phases, which are well-dispersed across the surface of the samples. This weak peak intensity may also be attributed to the low crystallinity or amorphous nature of these oxides. As a result, metal dispersion improved, leading to a synergistic effect compared to the parent catalyst (Okura, K., Promotion effect of rare-earth elements on the catalytic decomposition of ammonia over Ni/Al$_2$O$_3$ catalyst, *Applied Catalysis A: General*, Volume 505, 2015, pages 77-85). Moreover, the introduction of La, Ce, Nd, and Sm enhanced the dispersion of the NiO species on the support. No distinct peaks for metallic Ni were observed in the provided data.

Field emission scanning electron microscopy (FE-SEM) was performed to examine the surface morphology, shape, and size of the prepared materials. As depicted in FIG. 3, the images reveal highly agglomerated spherical particles clustered into chunks across the entire frame, a trend observed in 50% Ni/Al$_2$O$_3$, 3% La/Ni/Al$_2$O$_3$, 5% La/Ni/Al$_2$O$_3$, 5% Ce/Ni/Al$_2$O$_3$, 5% Nd/Ni/Al$_2$O$_3$ and 5% Sm/Ni/Al$_2$O$_3$ samples. However, after rare-earth element (La, Ce, Nd and Sm) impregnation, the catalysts' morphology improved, leading to better dispersion of the particles, as shown in FIG. 3. The spherical particles range in size from 100 to 200 nm.

Energy dispersive X-ray spectroscopic (EDS) studies were conducted to investigate the dispersion of the constituent elements in the samples, and the results are shown in FIG. 3. The uniform and homogeneous distribution of Ni on alumina was observed, and this trend continues in all the samples. Additionally, the rare-earth elements: La, Ce, Nd, and Sm are found to be evenly distributed in the 3% La/Ni/Al$_2$O$_3$, 5% La/Ni/Al$_2$O$_3$, 5% Ce/Ni/Al$_2$O$_3$, 5% Nd/Ni/Al$_2$O$_3$ and 5% Sm/Ni/Al$_2$O$_3$ across the entire surface of the Al$_2$O$_3$ matrix, further supporting the conclusions drawn from the XRD analysis. The identification of the constituent elements, including Ni, Al, O, La, Ce, Nd, and Sm, was achieved through their characteristic electron emission energies, clearly confirming the presence of these elements in the samples.

The uniform dispersion of Ni and the rare-earth metal oxides across the surface is a factor in enhancing the catalytic performance, as it indicates that the active sites are well-dispersed, maximizing the interaction with reactants. Moreover, the consistency of the EDS findings with the XRD results indicates that the rare-earth elements are effectively integrated into the Al$_2$O$_3$ support without segregation or clustering. The elemental maps from the EDS analysis further reinforce the conclusion of a homogeneously distributed catalyst, demonstrating that the impregnation of La, Ce, Nd, and Sm has been successfully achieved, leading to a well-structured composite material with potential catalytic advantages.

Transmission electron microscopy (TEM) was performed on the 50% Ni/Al$_2$O$_3$, 5% La/Ni/Al$_2$O$_3$, 5% Ce/Ni/Al$_2$O$_3$, 5% Nd/Ni/Al$_2$O$_3$, and 5% Sm/Ni/Al$_2$O$_3$ samples to examine their surface morphology and particle size distribution. The TEM images, presented in FIG. 4, provide valuable insights into the structural characteristics of the samples. For the Ni/Al$_2$O$_3$ sample, TEM imaging reveals a spherical and uniform distribution of particles, with sizes ranging from 10 to 50 nm. The observed particle sizes are consistent across the samples, indicating a controlled and uniform dispersion of the nickel species on the alumina support. This uniformity enhances catalytic performance, as it indicates an even distribution of active sites. The TEM analysis not only confirms the presence of nickel oxide but also demonstrates that the rare-earth oxides (La$_2$O$_3$, CeO$_2$, Nd$_2$O$_3$, Sm$_2$O$_3$) are successfully incorporated into the structure. High-resolution TEM (HR-TEM) imaging further supports these observations, providing detailed information on the interplanar distances (d-spacing) of the crystalline phases present in the samples. Specifically, the NiO particles exhibit interplanar distances of 2.01 and 2.38 Å, corresponding to the (111) and (200) planes, respectively. The d-spacing values for CeO$_2$, Nd$_2$O$_3$ and Sm$_2$O$_3$ are 3.08 Å, 2.87 Å, and 3.20 Å, respectively, further verifying their presence within the samples (FIG. 4). In particular, the HR-TEM images show that the NiO particles, with an average size of 31.1 nm, are well-dispersed on the alumina matrix. The interplanar distances of NiO measured at 2.01 Å, 2.38 Å, 1.43 Å, and 1.19 Å correspond to the (111), (200), (220), and (222) crystal planes of NiO, confirming its crystalline structure. This detailed analysis indicates that nickel oxide particles are highly crystalline, which is beneficial for catalytic activity. The uniform particle size and even distribution of NiO and the rare-earth oxides indicate that the synthesis method effectively produces a well-structured material, which can contribute to improved catalytic properties.

Figure 5A:
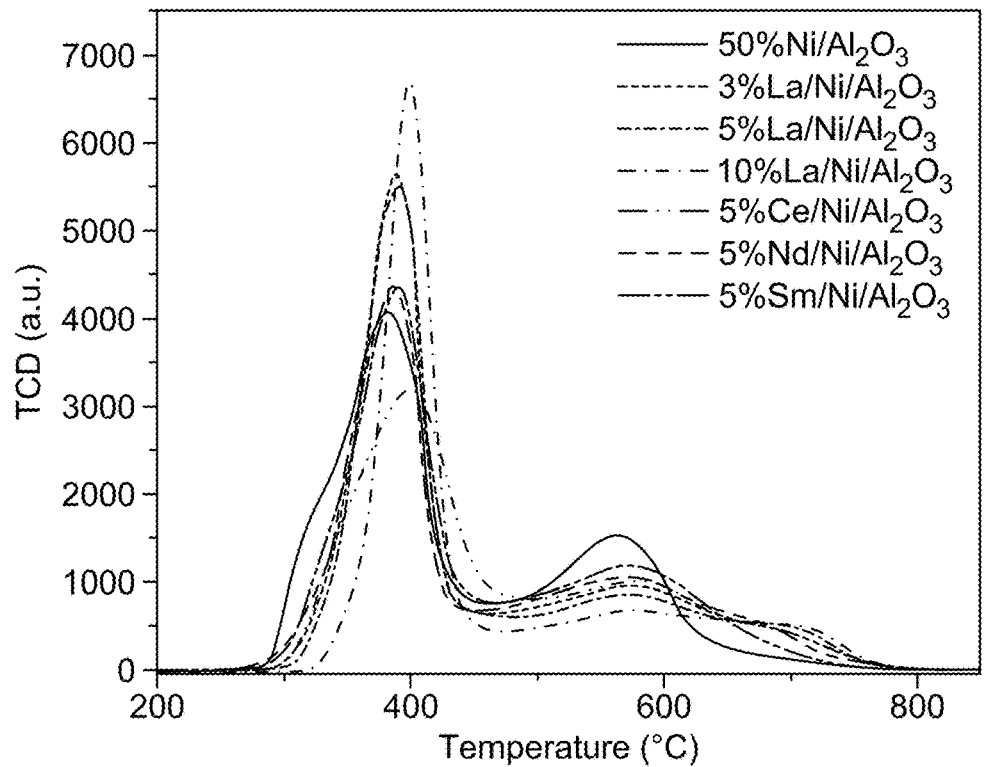
FIG. 5A is a graph depicting hydrogen temperature-programmed reduction (H$_2$-TPR) to assess the reducibility of alumina and metal-supported alumina catalysts, according to certain embodiments.
Figure 5B:
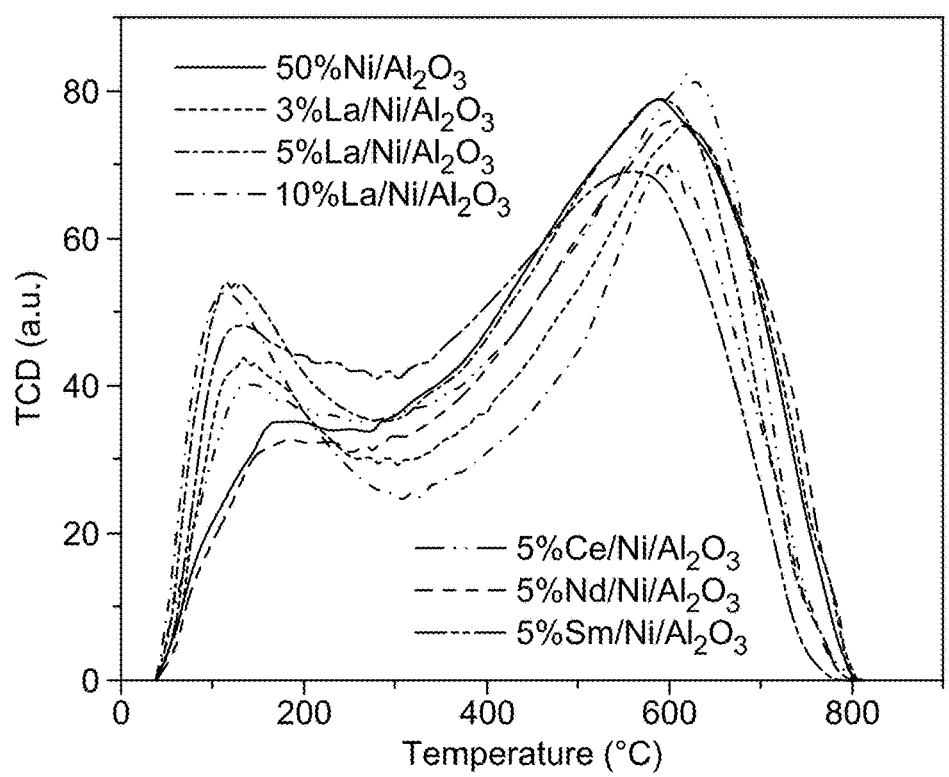
FIG. 5B is a graph depicting hydrogen temperature-programmed desorption (H$_2$-TPD) to assess the desorption of hydrogen from alumina and metal-supported alumina catalysts, according to certain embodiments.

Hydrogen temperature-programmed reduction (H$_2$-TPR) was conducted to assess the reducibility of alumina and metal-supported alumina catalysts, with the results shown in FIG. 5. The $H_2$-TPR profile for Ni/$Al_2O_3$ catalysts often displays multiple reduction peaks, corresponding to the distinct reduction stages of the metal species. The reduction of nickel and rare-earth oxide ($La_2O_3$, $CeO_2$, $Nd_2O_3$ and $Sm_2O_3$) to their respective metals (Ni, La, Ce, Nd, Sm) typically occurs within a lower temperature range of 300-400° C.

Figure 6A:
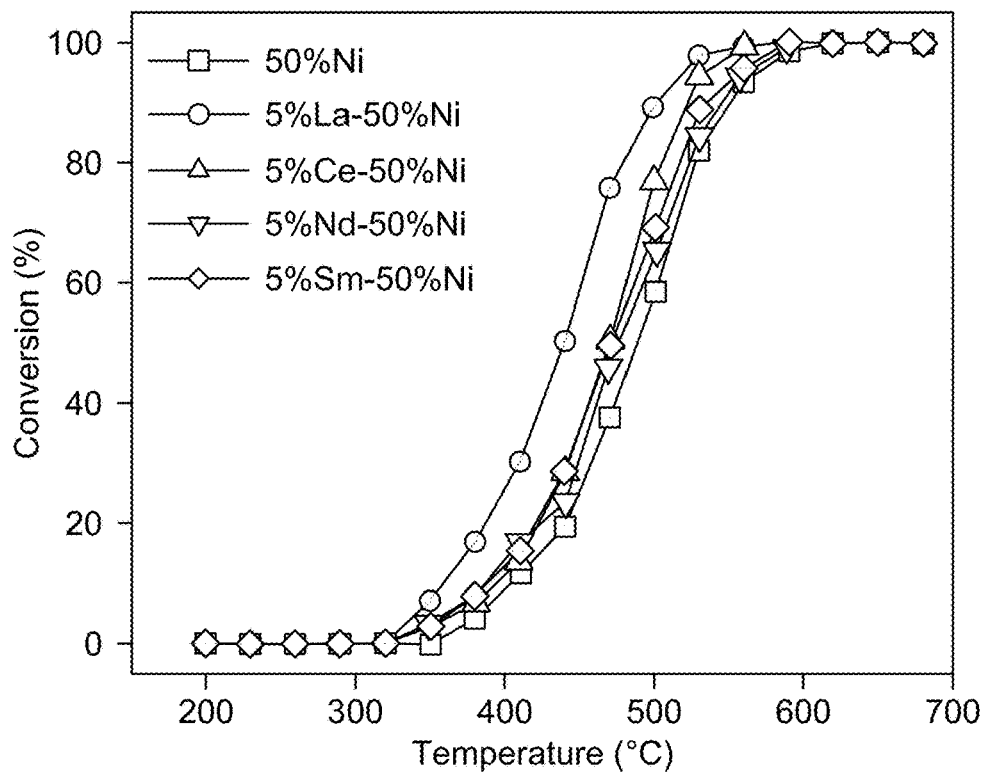
FIG. 6A is a graph showing a comparison of various catalysts for ammonia decomposition, according to certain embodiments.

The FIG. 6A shows the ammonia conversion as a function of temperature within the range of 250 to 650° C. for the 50% Ni/$Al_2O_3$ catalysts, with and without rare earth metal promoters (La, Ce, Nd and Sm). The results revealed that the incorporation of rare earth metals enhanced catalytic activity and that the addition of 5% La as a promoter enhances the catalytic activity of 50% Ni/$Al_2O_3$ for ammonia decomposition. The $NH_3$ conversion was initiated at 350° C. for the promoted 50% Ni/$Al_2O_3$ whereas ammonia decomposition started at 380° C. for unpromoted 50% Ni/$Al_2O_3$. The La-promoted catalyst (5% La-50% Ni/$Al_2O_3$) achieved 50% and 90% $NH_3$ conversion at a temperature of 450° C. and 510° C., respectively. The catalytic activity is enhanced beyond 450° C. as the $NH_3$ is decomposed from 50% to 90% with an increment of 60° C. However, the Ce-promoted and Sm-promoted catalysts achieved the 90% $NH_3$ conversion at 525° C. and 530° C., respectively. The unpromoted 50% Ni/$Al_2O_3$ was least active with 90% of $NH_3$ decomposition achieved at 555° C. Table 1 presents the ammonia conversion at different temperatures for all the catalysts. The catalytic activity for all the catalysts is as follows: 5% La-50% Ni/$Al_2O_3$>5% Ce-50% Ni/$Al_2O_3$>5% Sm-50% Ni/$Al_2O_3$>5% Nd-50% Ni/$Al_2O_3$>50% Ni/$Al_2O_3$.

TABLE 1

Temperatures of ammonia decomposition with rare earth-promoted Ni/Al2O3 catalysts
Temperature for $NH_3$ Conversion %
Catalysts

| | Initial Conv. | 25% Conv. | 50% Conv. | 75% Conv. | 90% Conv. |
|---|---|---|---|---|---|
| 50% Ni/$Al_2O_3$ | 380° C. | 450° C. | 490° C. | 515° C. | 555° C. |
| 5% La | 350° C. | 410° C. | 450° C. | 480° C. | 510° C. |
| 5% Sm | 350° C. | 430° C. | 470° C. | 510° C. | 530° C. |
| 5% Nd | 350° C. | 450° C. | 480° C. | 515° C. | 540° C. |
| 5% Ce | 350° C. | 430° C. | 470° C. | 500° C. | 525° C. |
| 3% La | 350° C. | 430° C. | 470° C. | 515° C. | 550° C. |
| 3% Sm | 350° C. | 430° C. | 480° C. | 515° C. | 550° C. |
| 3% Nd | 350° C. | 450° C. | 480° C. | 515° C. | 550° C. |
| 10% La | 350° C. | 450° C. | 480° C. | 515° C. | 545° C. |
| 10% Sm | 350° C. | 450° C. | 480° C. | 515° C. | 545° C. |

GHSV=20,400 mL/$g_{cat}$/h, Pressure=1 atm, Catalyst loading=100 mg

La as a promoter demonstrates enhanced catalytic activity for ammonia decomposition compared to other rear earth metals. The enhanced performance of the 5% La-50% Ni/$Al_2O_3$ catalyst can be attributed to the higher crystallinity and possibly better dispersion of active NiO phases, along with the formation of beneficial smaller crystallites or amorphous phases due to La doping. This factor contributes to an increase in the number and accessibility of active sites, leading to more efficient ammonia decomposition in the La-doped catalyst. Additionally, La could stabilize the Ni active sites against sintering during high-temperature reactions, maintaining a higher surface area and catalytic efficiency. These combined effects result in the enhanced performance observed in FIG. 6A, where the La-promoted catalyst achieves higher ammonia conversion at lower temperatures than the other nanocomposite materials tested.

Figure 6B:
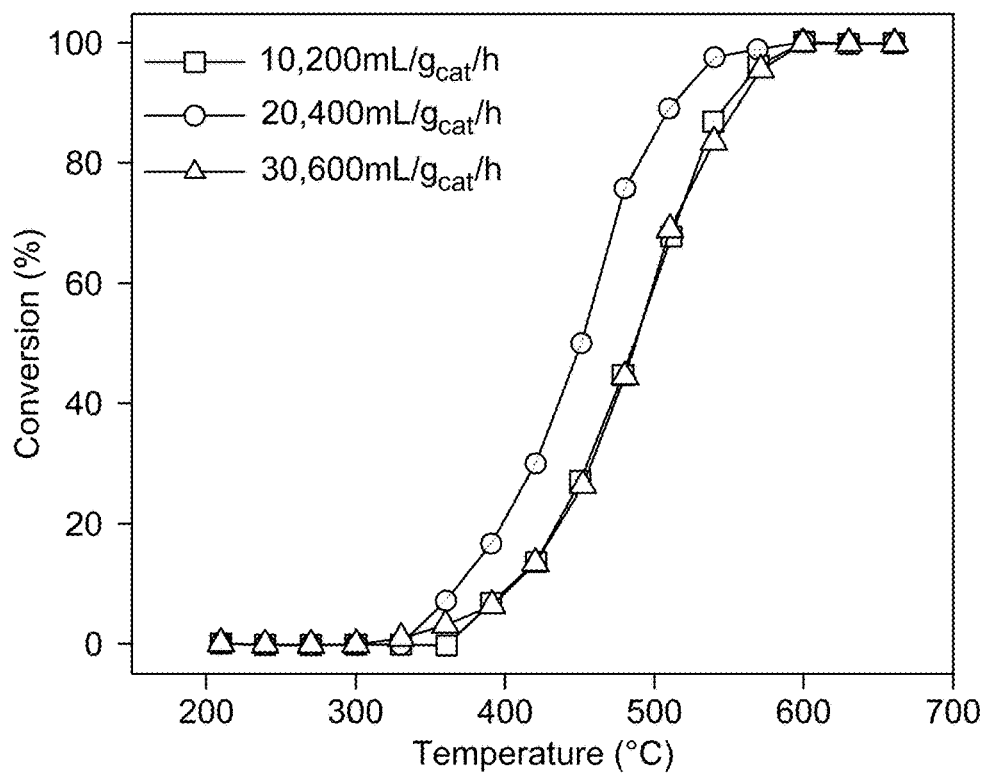
FIG. 6B is a graph depicting an effect of gas hourly space velocity on ammonia decomposition using 5% La-50% Ni/Al$_2$O$_3$, according to certain embodiments.

The effect of Gas Hourly Space Velocity (GHSV) on ammonia conversion was investigated using 5% La-50% Ni/$Al_2O_3$ catalyst as depicted in FIG. 6B. The results elucidated that a GHSV of 20,400 mL/$g_{cat}$/h yielded the highest conversion rates, with 90% ammonia conversion achieved at 510° C. Conversely, both lower (10,200 mL/$g_{cat}$/h) and higher (30,600 mL/$g_{cat}$/h) GHSVs resulted in slower conversion rates where 90% of $NH_3$ decomposition is achieved at 550° C. These results indicate that the flow rate affects the catalytic performance.

Figure 6C:
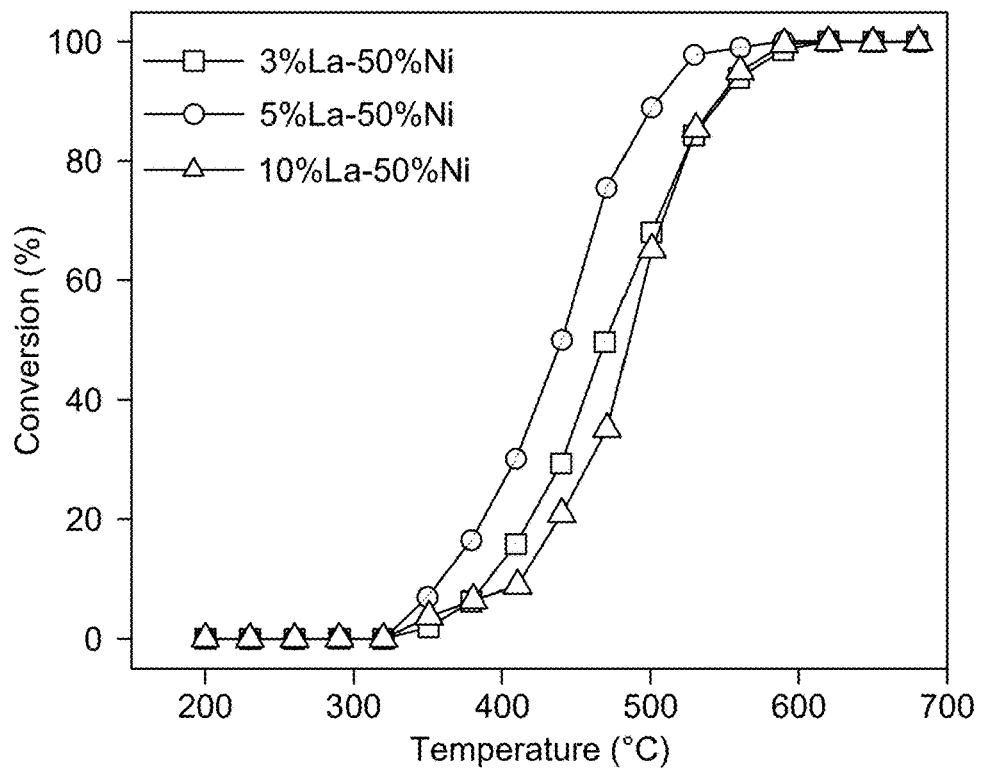
FIG. 6C is a graph of an effect of La loading on the ammonia decomposition, according to certain embodiments.
Figure 6D:
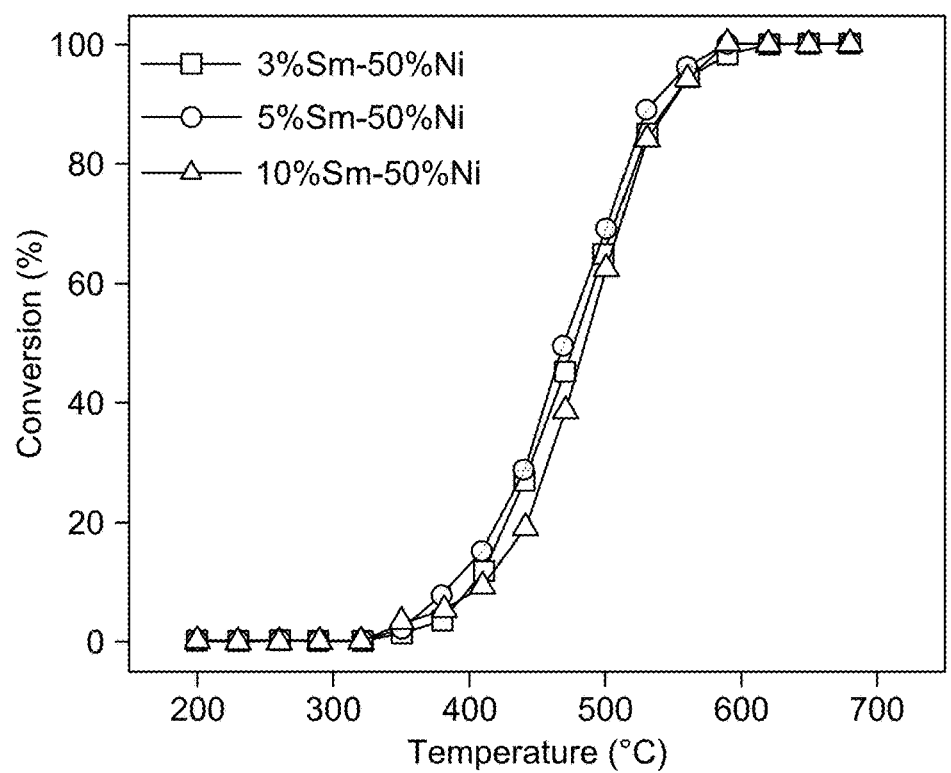
FIG. 6D is a graph of an effect of Sm loading on the ammonia decomposition, according to certain embodiments.

The effect of varying La and Sm loadings (3%, 5%, and 10%) on the catalytic activity of 50% Ni/$Al_2O_3$ for ammonia decomposition was investigated. The conversion rates are plotted as a function of temperature in FIGS. 6C-D. The results revealed that increasing the La loading from 3% to 5% enhances the catalytic performance, with 5% La-50% Ni/$Al_2O_3$ achieving higher conversion rates at lower temperatures as depicted in FIG. 6C. This improvement can be attributed to the dispersion of Ni particles and enhanced electronic interactions between La and Ni, which facilitates the dissociation of ammonia molecules. However, when the La loading is increased to 10%, the conversion rate decreases. This reduction in activity could be due to the excessive La leading to the agglomeration of Ni particles or coverage of active sites, which reduces the available surface area for the reaction. Additionally, higher La content might alter the electronic environment in a way that hinders catalytic activity, explaining the decline in conversion efficiency beyond the 5% loading. FIG. 6D elucidated the effect of Sm loading (3%, 5%, and 10%) on the catalytic performance of 50% Ni/$Al_2O_3$. The trends are similar to those observed with La loading, where the conversion rates increase from 3% to 5% Sm loading but do not show a substantial decline at 10% Sm loading. This indicates that while Sm acts as a promoter, its influence is less pronounced compared to La, and it may not cause as much agglomeration or blocking of active sites at higher loadings.

Figure 7A:
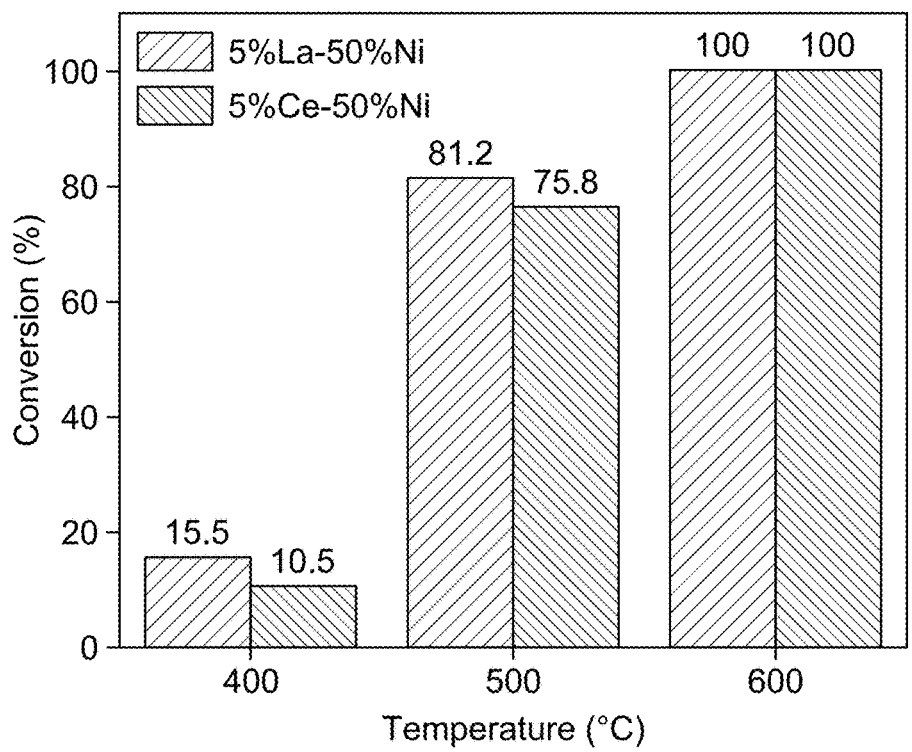
FIG. 7A is a graph showing a comparison of ammonia decomposition at various temperatures for the 5% La-50% Ni/Al$_2$O$_3$ and 5% Ce-50% Ni/Al$_2$O$_3$, according to certain embodiments.

FIG. 7A elucidates the effect of temperature on the conversion efficiency of ammonia decomposition using two different catalysts: 5% La-50% Ni/$Al_2O_3$ and 5% Ce-50% Ni/$Al_2O_3$. The experiments were conducted under a GHSV of 20,400 mL/$g_{cat}$/h with a catalyst mass of 100 mg. At 400° C., the 5% La-50% Ni/$Al_2O_3$ catalyst exhibited a conversion rate of 15.5%, which is higher than the 10.5% conversion achieved by the 5% Ce-50% Ni/$Al_2O_3$ catalyst. As the temperature increased to 500° C., the conversion rates improved for both catalysts, with 5% La-50% Ni/$Al_2O_3$ reaching 81.2% and 5% Ce-50% Ni/$Al_2O_3$ achieving 75.8%. At 600° C., both catalysts achieved complete conversion (100%). These results revealed that both La and Ce promoted ammonia decomposition, with La showing slightly higher activity at lower temperatures compared to Ce. However, both promoters enable full conversion at 600° C., indicating that their performance differences diminish at higher temperatures.

Figure 7B:
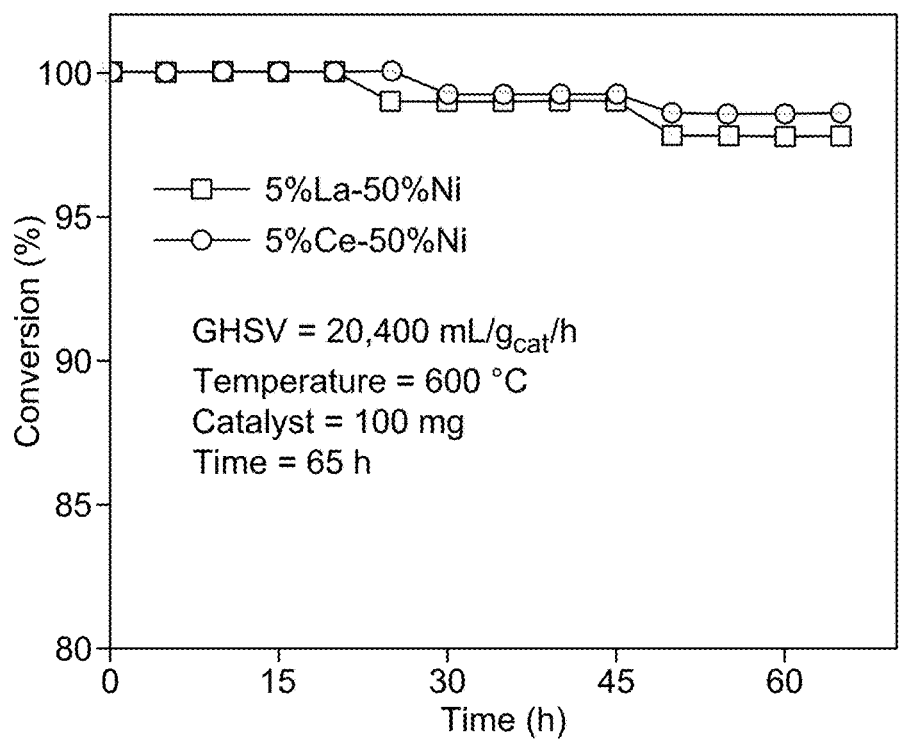
FIG. 7B is a graph showing a stability test for the 5% La-50% Ni/Al$_2$O$_3$ and 5% Ce-50% Ni/Al$_2$O$_3$ for a period of 65 h, according to certain embodiments.

The stability of the best-performing catalysts, 5% La-50% Ni/$Al_2O_3$ and 5% Ce-50% Ni/$Al_2O_3$ over time at 600° C. with a GHSV of 20,400 mL/$g_{cat}$/h was studied. The results elucidated that the catalysts maintained the ammonia conversion rate close to 100% over the first 20 h and showed a slight decrease in activity afterwards till a period of 65 h of continuous operation as shown in FIG. 7B. The 5% Ce-50% Ni/$Al_2O_3$ was found out to be slightly more stable (yielding ammonia conversion of 98.6%) than 5% La-50% Ni/$Al_2O_3$ (which decomposed ammonia up to 97.8% after a period of 65 h). The higher stability of the Ce promoted catalyst is attributed to strong interaction with Ni nanoparticles which assists in preventing the sintering of Ni nanoparticles and provides resistance in deactivation of the catalysts.

In this disclosure, the catalytic performance of 50% Ni/Al$_2$O$_3$ for NH$_3$ decomposition can be enhanced by the addition of rare earth metal promoters, particularly La and Ce. Among the tested catalysts, 5% La-50% Ni/Al$_2$O$_3$ exhibited the highest activity, achieving 90% ammonia conversion at 510° C., which is notably lower than the temperatures required for 5% Ce-50% Ni/Al$_2$O$_3$ (525° C.) and 5% Sm-50% Ni/Al$_2$O$_3$ (530° C.) to achieve the 90% NH$_3$ conversion. The unpromoted 50% Ni/Al$_2$O$_3$ was the least active, needing 555° C. to achieve 90% conversion. The catalytic activity followed the order: 5% La-50% Ni/Al$_2$O$_3$>5% Ce-50% Ni/Al$_2$O$_3$>5% Sm-50% Ni/Al$_2$O$_3$>5% Nd-50% Ni/Al$_2$O$_3$>50% Ni/Al$_2$O$_3$. This enhancement is attributed to the loading of La, which improves the dispersion of active NiO phases and promotes the formation of smaller crystallites or amorphous phases, thereby increasing the number and accessibility of active sites. However, increasing the loadings of La and Sm beyond 5% resulted in a decline in performance, likely due to the agglomeration of Ni particles or the coverage of active sites, reducing the effective surface area for the reaction. The study also identified that the most useful GHSV for the 5% La-50% Ni/Al$_2$O$_3$ catalyst is 20,400 ml/g$_{cat}$/h, which yielded the highest conversion rates. Additionally, both 5% La-50% Ni/Al$_2$O$_3$ and 5% Ce-50% Ni/Al$_2$O$_3$ demonstrated excellent stability in ammonia decomposition over a period of 65 h. These findings highlight the role of promoter selection in the development of efficient catalysts for ammonia decomposition. La has been identified as an effective promoter, offering valuable insights for the design of advanced catalysts in this field.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of producing hydrogen from ammonia, comprising:
exposing ammonia to a rare-earth/NiO/Al$_2$O$_3$ nanocomposite material,
wherein the rare-earth/NIO/Al$_2$O$_3$ nanocomposite material catalyzes the decomposition of ammonia into hydrogen,
wherein the exposing includes contacting the rare-earth/NiO/Al$_2$O$_3$ nanocomposite material with a gas mixture comprising ammonia at a GHSV of 16,000 to 25,000 mL/gram catalyst/h, wherein the gas mixture comprises ammonia at a concentration of 1 to 20 vol % based on the total volume of the gas mixture,
wherein the rare-earth/NiO/Al$_2$O$_3$ nanocomposite material is in the form of rare-earth doped NiO nanoparticles distributed on a Al$_2$O$_3$ matrix,
wherein the rare-earth doped NiO nanoparticles comprise a rare-earth dopant selected from the group consisting of La, Ce, Nd, Sm and combinations thereof, at a concentration of 3 to 10 wt. % based on the total weight of the rare-earth/NiO/Al$_2$O$_3$ nanocomposite material,
wherein the rare-earth doped NiO nanoparticles are spherical with an average diameter in a range from 1 to 200 nm,
wherein the rare-earth/NiO/Al$_2$O$_3$ nanocomposite material achieves a 90% or greater conversion of ammonia to hydrogen, based on the total amount of ammonia, at a temperature less than or equal to 540° C. when used to catalyze the decomposition of ammonia,
wherein the rare-earth/NiO/Al$_2$O$_3$ nanocomposite material is produced by the following method:
combining a nickel-containing salt and Al$_2$O$_3$ by dry grinding to form a first mixture;
calcining the first mixture to form metal hydroxides and remove volatiles to form a first intermediate;
combining the first intermediate and a rare-earth metal-containing salt by dry grinding to form a second mixture; and
calcining the second mixture to form metal hydroxides and remove volatiles to form the rare-earth/NiO/Al$_2$O$_3$ nanocomposite material.

2. The method of claim 1, wherein the rare-earth doped NiO nanoparticles have an average diameter in a range from 5 to 60 nm.

3. The method of claim 2, wherein the rare-earth doped NiO nanoparticles have an average diameter in a range from 10 to 50 nm.

4. The method of claim 3, wherein the rare-earth doped NiO nanoparticles have an average diameter of 30 nm.

5. The method of claim 4, wherein the rare-earth/NiO/Al$_2$O$_3$ nanocomposite material achieves a 90% or greater conversion of ammonia to hydrogen, based on the total amount of ammonia, at a temperature less than or equal to 530° C. when used to catalyze the decomposition of ammonia.

6. The method of claim 5, wherein the rare-earth/NiO/Al$_2$O$_3$ nanocomposite material achieves a 90% or greater conversion of ammonia to hydrogen, based on the total amount of ammonia, at a temperature less than or equal to 520° C. when used to catalyze the decomposition of ammonia.

7. The method of claim 6, wherein the rare-earth/NiO/Al$_2$O$_3$ nanocomposite material achieves a 90% or greater conversion of ammonia to hydrogen, based on the total amount of ammonia, at a temperature less than or equal to 510° C. when used to catalyze the decomposition of ammonia.

8. The method of claim 1, wherein the rare-earth/NiO/Al$_2$O$_3$ nanocomposite material achieves a 100% conversion of ammonia to hydrogen, based on the total amount of ammonia, at a temperature of 600° C. with a gas hourly speed velocity (GHSV) of 20,400 mL/gram catalyst/h when used to catalyze the decomposition of ammonia.

9. The method of claim 8, wherein the rare-earth/NiO/Al$_2$O$_3$ nanocomposite material maintains a 100% conversion of ammonia to hydrogen, based on the total amount of ammonia, for 10 or more hours.

10. The method of claim 9, wherein the rare-earth/NIO/Al$_2$O$_3$ nanocomposite material maintains a 100% conversion of ammonia to hydrogen, based on the total amount of ammonia, for 20 or more hours.

11. The method of claim 8, wherein the rare-earth/NiO/Al$_2$O$_3$nanocomposite material maintains a 95% or greater conversion of ammonia to hydrogen, based on the total amount of ammonia, for 60 or more hours.

12. The method of claim 11, wherein the rare-earth/NiO/Al$_2$O$_3$ nanocomposite material maintains a 97.5% or greater conversion of ammonia to hydrogen, based on the total amount of ammonia, for 60 or more hours.

13. The method of claim 1, wherein the rare-earth doped NiO nanoparticles comprise the rare-earth dopant at a concentration of 3 to 5 wt. % based on the total weight of the rare-earth/NiO/Al$_2$O$_3$ nanocomposite material.

14. The method of claim 1, wherein the rare-earth dopant is La.

15. The method of claim 1, wherein the rare-earth dopant is Ce.

16. The method of claim 1, wherein the rare-earth dopant is Nd.

17. The method of claim 1, wherein the rare-earth dopant is Sm.

18. The method of claim 1, wherein the rare-earth/NiO/$Al_2O_3$ nanocomposite material comprises 50 wt. % NiO, based on the combined weight of NiO and $Al_2O_3$.

* * * * *